(12) United States Patent
Aoki et al.

(10) Patent No.: US 12,454,037 B2
(45) Date of Patent: Oct. 28, 2025

(54) IMPACT TOOL

(71) Applicant: MAKITA CORPORATION, Anjo (JP)

(72) Inventors: Kazuma Aoki, Anjo (JP); Tomoro Aoyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/907,975

(22) Filed: Oct. 7, 2024

(65) Prior Publication Data

US 2025/0058436 A1  Feb. 20, 2025

Related U.S. Application Data

(63) Continuation of application No. 18/325,313, filed on May 30, 2023, now Pat. No. 12,138,753.

(30) Foreign Application Priority Data

Jun. 13, 2022 (JP) ................. 2022-094845

(51) Int. Cl.
  *B25B 21/02* (2006.01)
(52) U.S. Cl.
  CPC ................... *B25B 21/02* (2013.01)
(58) Field of Classification Search
  CPC .... B22F 3/26; B22F 7/062; B22F 7/08; B22F 5/106; B22F 3/12; B22F 2998/10; B22F 3/02; B22F 3/10; B23P 15/00; F16C 17/04; F16C 33/104; F16C 33/1025; F16C 17/02; F16C 2220/60; F16C 17/26; F16C 2220/20; F16C 2322/50; B25B 21/02; B25D 17/26; B25D 2217/0096; B25D 2217/0019; B25D 16/00; B33Y 80/00; B22D 19/00

See application file for complete search history.

(56) References Cited

U.S. PATENT DOCUMENTS

| | | | |
|---|---|---|---|
| 9,643,300 B2 * | 5/2017 | Kumagai | ............... B25F 5/008 |
| 2011/0180286 A1 | 7/2011 | Oomori et al. | |
| 2014/0145524 A1 * | 5/2014 | Tanimoto | ............ H02K 1/2706 |
| | | | 310/50 |
| 2014/0182869 A1 | 7/2014 | Kumagai et al. | |

FOREIGN PATENT DOCUMENTS

CN          205651274 U    10/2016

* cited by examiner

*Primary Examiner* — Nathaniel C Chukwurah
(74) *Attorney, Agent, or Firm* — J-TEK LAW PLLC; Jeffrey D. Tekanic; Scott T. Wakeman

(57) ABSTRACT

An impact tool (1) includes: a motor (6) having a rotor (27) that is rotatable about a rotational axis (AX); a spindle (8) disposed forward of the stator and rotating when the rotor rotates; an anvil (10) having at least a portion disposed forward of the spindle and mounting a bit (300); a hammer (47), which rotatably impacts the anvil; and a housing (2), which has a motor-housing part (21) that houses the motor. The maximum tightening torque is 140 N·m or more. Overall length (La), which is the distance—in the front-rear direction parallel to the rotational axis—between a rear-end portion of the motor-housing part and a front-end portion of the anvil, is 100 mm or less. The hammer has a base portion, a front-side ring portion protruding forward from the base portion, and hammer projection portions protruding radially inward from the front ring portion.

8 Claims, 20 Drawing Sheets

FIG.14
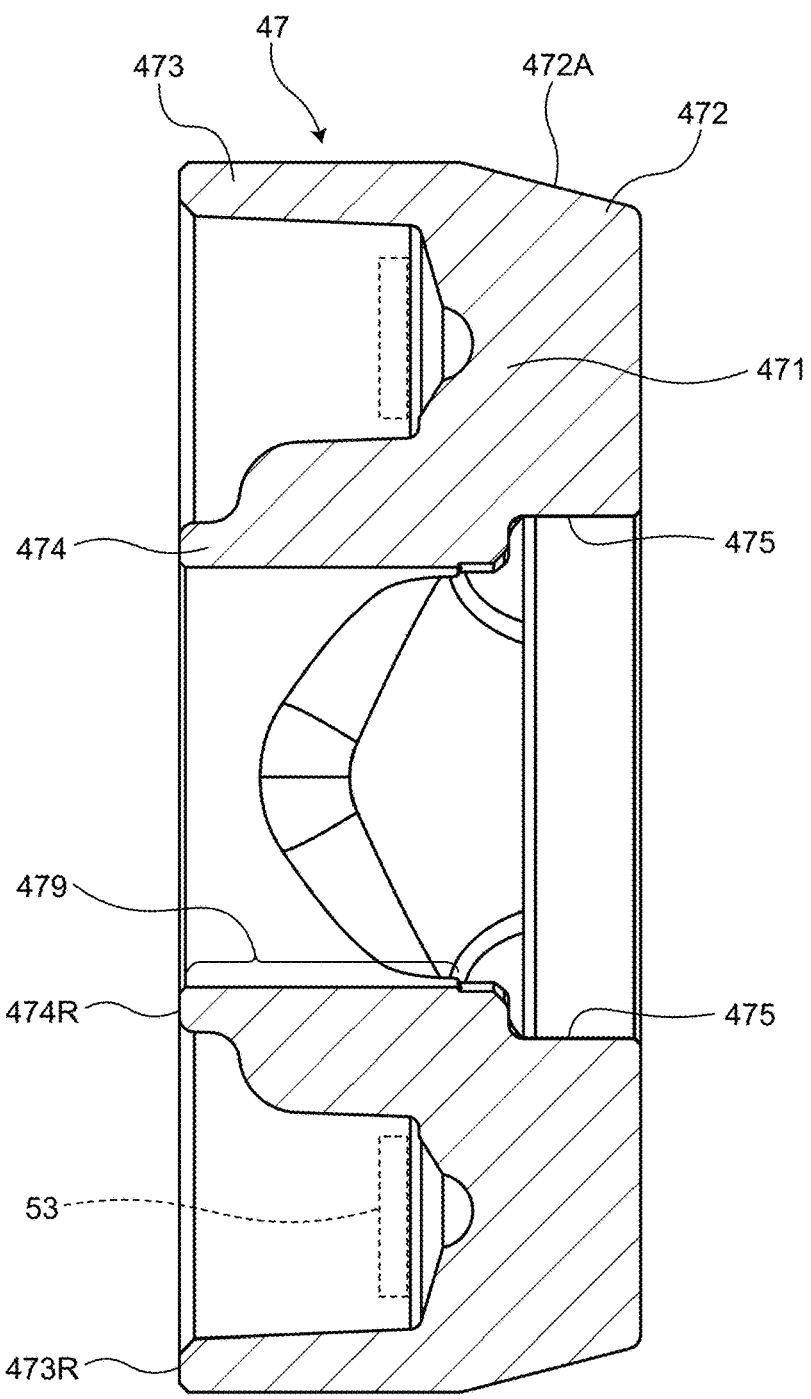
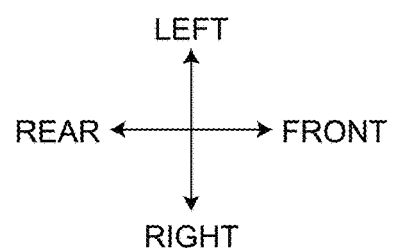

FIG.16

| | EMBODIMENT | COMPARATIVE EXAMPLE 1 | COMPARATIVE EXAMPLE 2 | COMPARATIVE EXAMPLE 3 |
|---|---|---|---|---|
| VOLTAGE [V] | 18 | 18 | 18 | 18 |
| OVERALL LENGTH La [mm] | 97 | 98 | 99 | 100 |
| MAXIMUM WIDTH Ma [mm] WHEN BATTERY PACK IS MOUNTED | 81 | 84 | 79 | 78 |
| MAXIMUM HEIGHT Ha [mm] | 234 | 243 | 237 | 256 |
| HEAD-PORTION WIDTH Wa [mm] | 53.4 | 63.5 | 66.5 | 66 |
| CENTER HEIGHT Hc [mm] | 26.3 | 30 | 30 | 35 |
| HEAD-PORTION WIDTH Wa/ OVERALL LENGTH La | 0.55 | 0.65 | 0.67 | 0.66 |
| MASS [kg] | 1 | 1.3 | 1.1 | 1.3 |
| MAXIMUM TIGHTENING TORQUE [Nm] | 140 | 155 | 165 | 206 |
| NO-LOAD ROTATIONAL SPEED [rpm] | 0-3400 | 0-2700 | 0-2900 | 0-3250 |
| IMPACTS PER MINUTE [ipm] | 0-4100 | 0-4100 | 0-4400 | 0-3800 |

FIG.17

| MEASUREMENT RESULT | EMBODIMENT | COMPARATIVE EXAMPLE 1 | COMPARATIVE EXAMPLE 2 | COMPARATIVE EXAMPLE 3 |
|---|---|---|---|---|
| DIRECTLY ABOVE | 11.4 | — | 12.2 | 12.5 |
| DIRECTLY ACROSS | 11.0 | — | 16.2 | 15.7 |
| 45° TILT | 11.9 | — | 13.2 | 12.9 |

IMPACT TOOL

CROSS-REFERENCE TO RELATED APPLICATION

This application claims priority to U.S. patent application Ser. No. 18/325,313 filed on May 30, 2023, now pending, which claims priority to Japanese patent application no. 2022-094845 filed on Jun. 13, 2022, the contents of which are fully incorporated herein by reference.

TECHNICAL FIELD

The techniques disclosed in the present specification relate to an impact tool, such as an impact driver or impact wrench.

BACKGROUND ART

Chinese Utility Model No. 205651274 (U) discloses an impact tool related to the present teachings.

SUMMARY

In some situations, it may be desired to use an impact tool to tighten a screw, bolt, etc. in a cramped location proximate to a wall. There is demand for a design of an impact tool that enables such tightening work to be performed easily, even in a cramped location.

It is one non-limiting object of the present teachings to disclose techniques for designing an impact tool with which work can be performed easily, even in a cramped location.

In one non-limiting aspect of the present teachings, an impact tool may comprise: a motor comprising a stator and a rotor, at least a portion of which is disposed in the interior of the stator and which rotates about a rotational axis; a spindle, which is disposed more forward than the stator and rotates owing to a rotational force of the rotor; an anvil, at least a portion of which is disposed more forward than the spindle and in which a bit is mountable; a hammer, which impacts the anvil in a rotational direction; and a housing, which has a motor-housing part that houses the motor. The maximum tightening torque may be 140 N·m or more. Overall length La, which is the distance—in the front-rear direction parallel to the rotational axis-between a rear-end portion of the motor-housing part and a front-end portion of the anvil, may be 100 mm or less. Center height He, which is the distance in the up-down direction between the rotational axis and an upper-end portion of the motor-housing part, may be 29 mm or less.

Such an impact tool facilitates performing tightening work, e.g., even in a cramped location.

BRIEF DESCRIPTION OF THE DRAWINGS

FIG. 14 is a transverse, cross-sectional view that shows the hammer according to the present embodiment.

FIG. 16 is a table that shows the specifications of the impact tool according to the present embodiment and the impact tool according to comparative examples.

FIG. 17 is a table that shows corner-driving angles of the impact tool according to the present embodiment and the impact tool according to comparative examples.

DETAILED DESCRIPTION

Figure 1:
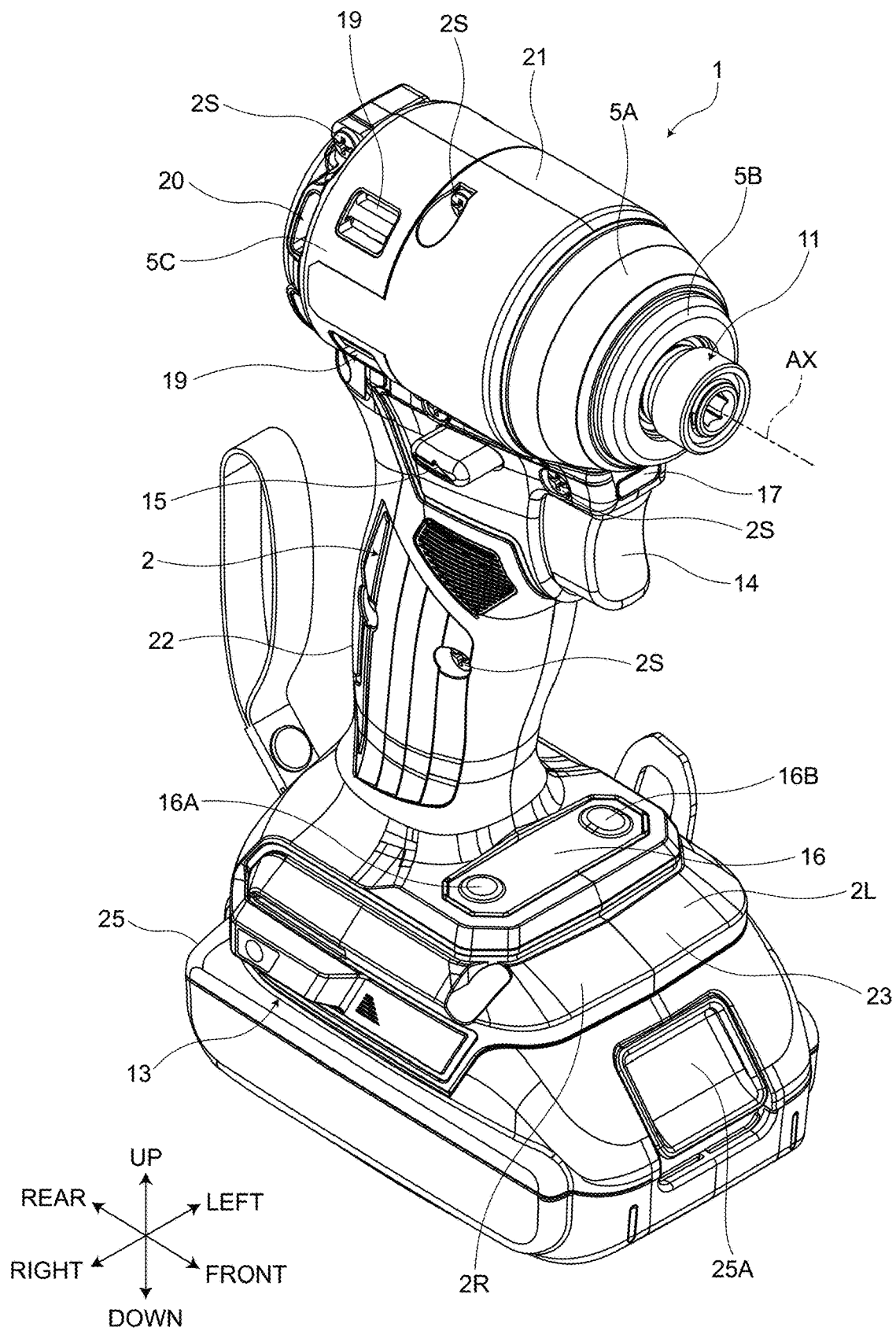
FIG. 1 is an oblique view, viewed from the front, that shows an impact tool according to an embodiment, which is representative of the present teachings.

As was mentioned above, an impact tool may comprise: a motor comprising a stator and a rotor, at least a portion of which is disposed in the interior of the stator and which rotates (is rotatable) about a rotational axis; a spindle, which is disposed more forward than the stator and rotates (is configured/adapted to rotate) owing to (in response to application of) a rotational force of (from) the rotor; an anvil, at least a portion of which is disposed more forward than the spindle and in which a bit (tool bit, driver bit, etc.) is mountable; a hammer, which impacts (is configured/adapted to impact) the anvil in a rotational direction; and a housing, which has a motor-housing part that houses the motor.

The maximum tightening torque may be 140 N·m or more.

Overall length La, which is a distance—in a front-rear direction parallel to the rotational axis—between a rear-end portion of the motor-housing part and a front-end portion of the anvil, may be 100 mm or less.

Center height Hc, which is a distance in the up-down direction between the rotational axis and an upper-end portion of the motor-housing part, may be 29 mm or less.

Total overall length Lh, which is a distance in the front-rear direction between a rear-end portion of the motor-housing part and a front-end portion of the bit mounted on the anvil, may be 140 mm or less.

Corner-driving angle θ, which is an angle formed between the rotational axis and a floor surface when work is performed at a wall surface orthogonal to the floor surface using the bit to tighten a screw at a location that is upward by 10 mm from the floor surface, may be 12° or less.

Head-portion width Wa, which is the dimension of the motor-housing part in a left-right direction, may be 65 mm or less.

The ratio [Wa/La] of head-portion width Wa to overall length La may be 0.6 or less.

According to the above-mentioned configuration, a user can easily perform tightening work using the impact tool, even in a cramped portion or a corner portion.

A representative, non-limiting embodiment of the present teachings is explained below, with reference to the drawings. In the embodiment, positional relationships among the parts are explained using the terms left, right, front, rear, up, and down. These terms indicate relative position or direction, wherein the center of an impact tool 1 is the reference. The impact tool 1 comprises a motor 6, which serves as a motive power supply.

In the embodiment, the direction parallel to rotational axis AX of the motor 6 is called the axial direction where appropriate, the direction that goes around rotational axis AX is called the circumferential direction or the rotational direction where appropriate, and the radial direction of rotational axis AX is called the radial direction where appropriate.

Rotational axis AX extends in a front-rear direction. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

Figure 2:
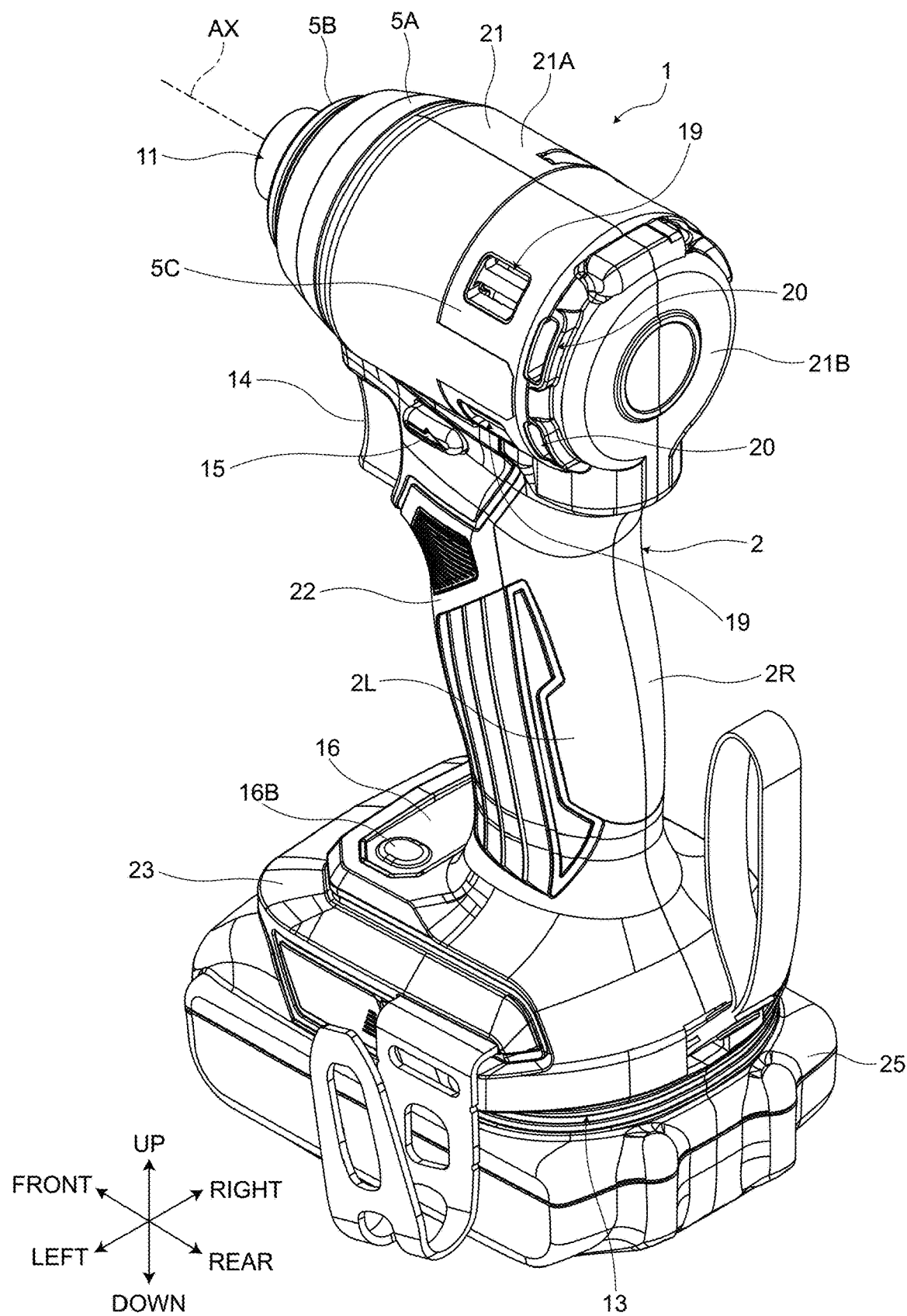
FIG. 2 is an oblique view, viewed from the rear, that shows the impact tool according to the present embodiment.
Figure 3:
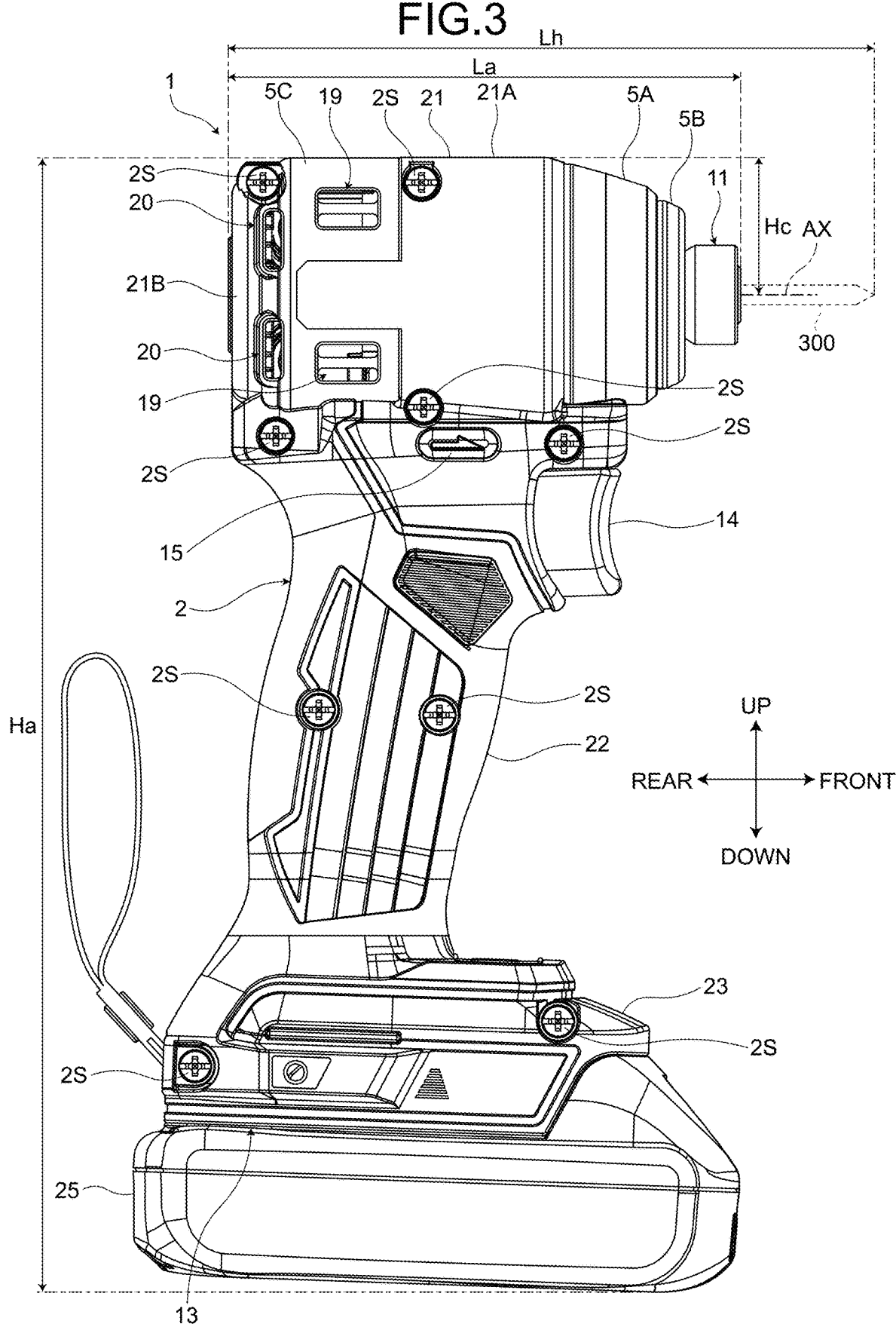
FIG. 3 is a side view that shows the impact tool according to the present embodiment.
Figure 4:
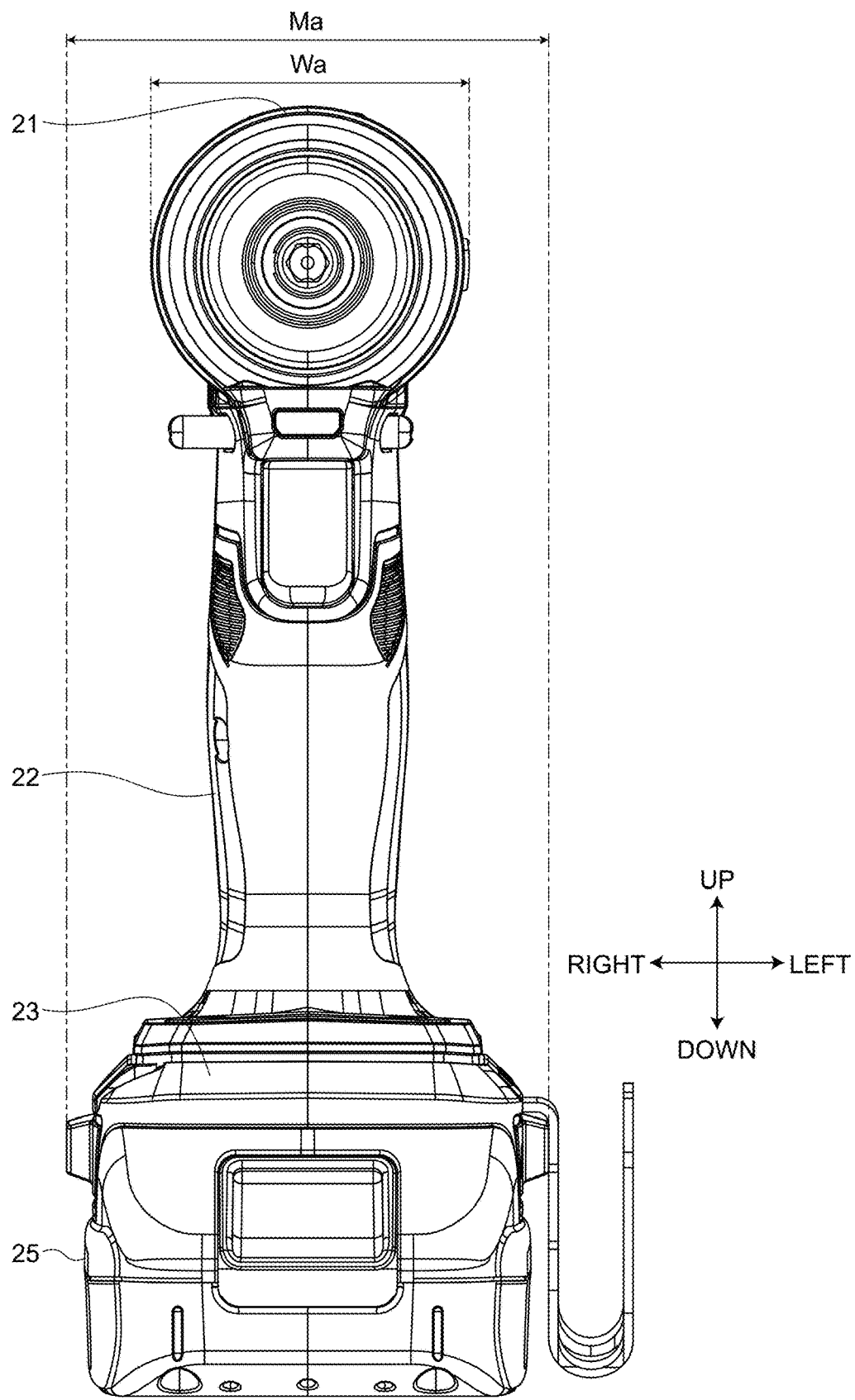
FIG. 4 is a front view that shows the impact tool according to the present embodiment.
Figure 5:
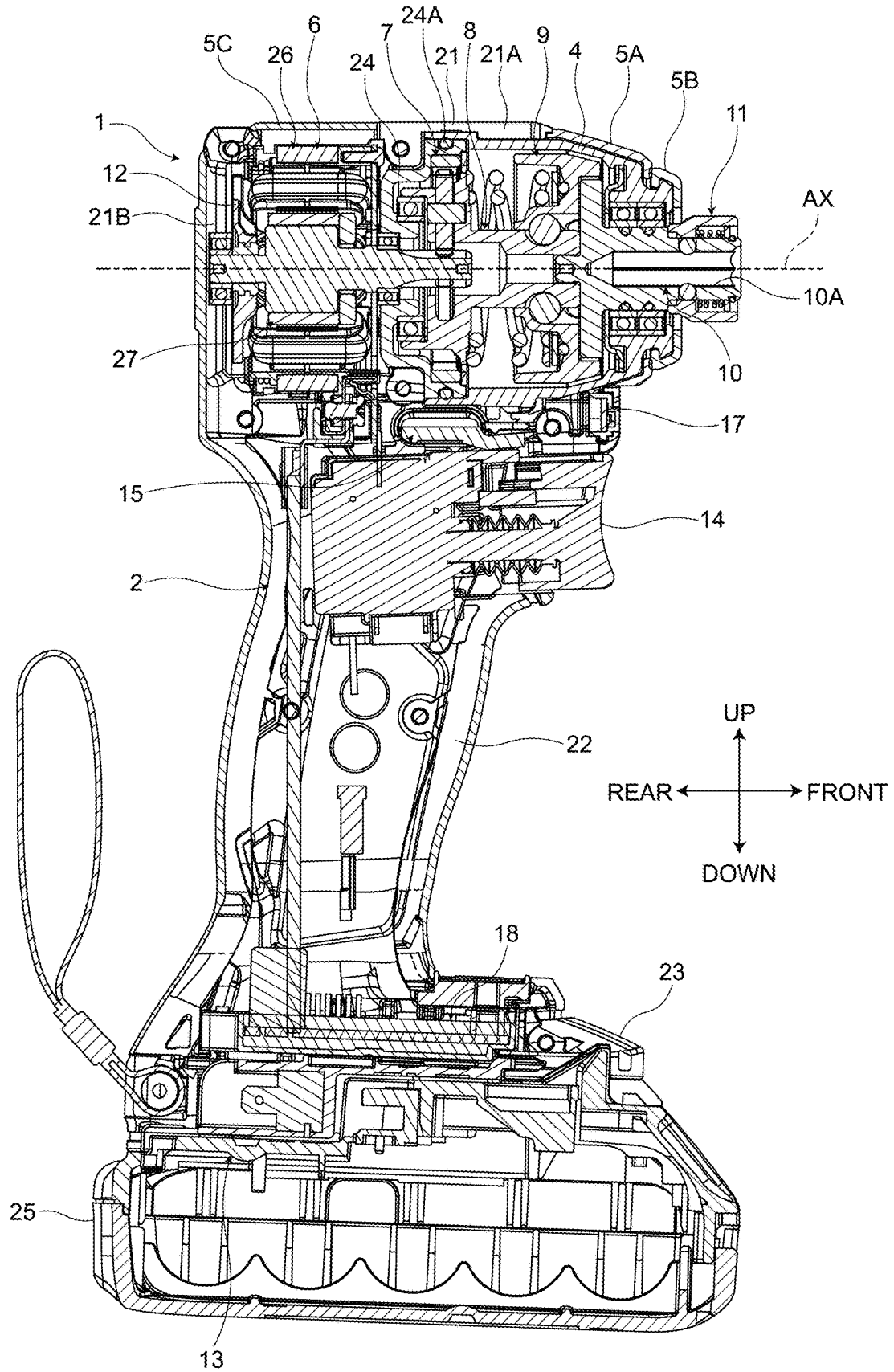
FIG. 5 is a longitudinal, cross-sectional view that shows the impact tool according to the present embodiment.

Impact Tool FIG. 1 is an oblique view, viewed from the front, that shows the impact tool 1 according to the representative, non-limiting embodiment of the present teachings. FIG. 2 is an oblique view, viewed from the rear, that shows the impact tool 1. FIG. 3 is a side view that shows the impact tool 1. FIG. 4 is a front view that shows the impact tool 1. FIG. 5 is a longitudinal, cross-sectional view that shows the impact tool 1.

In the embodiment, the impact tool 1 is an impact driver, which is one type of screw tightening tool. The impact tool 1 can perform, for example, screw-tightening work. The impact tool 1 comprises a housing 2, a hammer case 4, a hammer-case cover 5A, a bumper 5B, a housing cover 5C, the motor 6, a speed-reducing mechanism 7, a spindle 8, an impact (hammer) mechanism 9, an anvil 10, a bit-holding mechanism (tool-holding mechanism) 11, a fan 12, a battery-mounting part 13, a trigger 14, a forward/reverse-change switch (reversing lever or reversing switch lever) 15, an operation-and-display part (operation panel and display) 16, a light 17, and a controller 18.

The housing 2 is made of a synthetic resin (polymer). In the present embodiment, the housing 2 is made of nylon (polyamide). The housing 2 comprises a left housing 2L and a right housing 2R, which is disposed rightward of the left housing 2L. The left housing 2L and the right housing 2R are fixed to each other by a plurality of screws 2S. The housing 2 is constituted from a pair of half housings.

The housing 2 comprises a motor-housing part 21, a grip part 22, and a battery-holding part 23.

The motor-housing part 21 houses the motor 6. The motor-housing part 21 has a tubular part 21A and a rear-plate part 21B, which is integrally connected to a rear-end portion of the tubular part 21A. The motor-housing part 21 houses at least a portion of the hammer case 4.

The grip part 22 is gripped by the user. The grip part 22 extends downward from the motor-housing part 21. The trigger 14 is provided on a front portion of the grip part 22 at an upper portion thereof.

The battery-holding part 23 holds a battery pack 25 via the battery-mounting part 13. The battery-holding part 23 is connected to a lower-end portion of the grip part 22. In both the front-rear direction and the left-right direction, the dimension of the outer shape of the battery-holding part 23 is larger than the dimension of the outer shape of the grip part 22.

The motor-housing part 21 has air-intake openings 19 and air-exhaust openings 20. The air-exhaust openings 20 are provided more rearward than the air-intake openings 19. Air from outside of the housing 2 flows into the interior space of the housing 2 via the air-intake openings 19. Air in the interior space of the housing 2 flows out to the outside of the housing 2 via the air-exhaust openings 20.

The hammer case 4 houses the speed-reducing mechanism 7, the spindle 8, the impact mechanism 9, and at least a portion of the anvil 10. At least a portion of the speed-reducing mechanism 7 is disposed in the interior of the bearing box 24. The speed-reducing mechanism 7 comprises a plurality of gears.

The hammer case 4 is made of a metal. In the present embodiment, the hammer case 4 is made of aluminum. The hammer case 4 is tube shaped. The hammer case 4 is connected to a front portion of the motor-housing part 21. The bearing box 24 is fixed to a rear portion of the hammer case 4. A tubular, outer surface is formed at an outer-circumferential portion of the bearing box 24. A tubular, inner surface is formed at an inner-circumferential portion of the hammer case 4. The bearing box 24 is fitted to a rear portion of the hammer case 4 via an O-ring 24A. By coupling the tubular, outer surface of the bearing box 24 and the tubular, inner surface of the hammer case 4 to each other via the O-ring 24A, the bearing box 24 and the hammer case 4 are fixed to each other. The hammer case 4 is sandwiched between the left housing 2L and the right housing 2R. At least a portion of the hammer case 4 is housed in the motor-housing part 21. The bearing box 24 is fixed to both the motor-housing part 21 and the hammer case 4.

The hammer-case cover 5A covers at least a portion of the surface of the hammer case 4. The bumper 5B is mounted on a front-end portion of the hammer case 4. The hammer-case cover 5A and the bumper 5B protect the hammer case 4. The hammer-case cover 5A and the bumper 5B block (shield) contact between the hammer case 4 and objects around the hammer case 4. The housing cover 5C covers at least a portion of the surface of the housing 2.

The motor 6 is the motive-power source (prime mover) of the impact tool 1. The motor 6 is an inner-rotor-type brushless motor. The motor 6 comprises a stator 26 and a rotor 27. The stator 26 is supported by the motor-housing part 21. At least a portion of the rotor 27 is disposed in the interior of the stator 26. The rotor 27 rotates relative to the stator 26. The rotor 27 rotates about rotational axis AX, which extends in the front-rear direction.

The speed-reducing mechanism 7 couples the rotor 27 and the spindle 8 to each other. The speed-reducing mechanism 7 transmits the rotation of the rotor 27 to the spindle 8. The speed-reducing mechanism 7 causes the spindle 8 to rotate at a rotational speed that is lower than the rotational speed of the rotor 27. The speed-reducing mechanism 7 is disposed more forward than the motor 6. The speed-reducing mechanism 7 comprises a planetary-gear mechanism. The speed-reducing mechanism 7 comprises a plurality of gears. The gears of the speed-reducing mechanism 7 are driven by the rotor 27.

The spindle 8 is rotated by the rotational force of the rotor 27 transmitted by the speed-reducing mechanism 7. The spindle 8 is disposed more forward than at least a portion of the motor 6. The spindle 8 is disposed more forward than the stator 26. At least a portion of the spindle 8 is disposed more forward than the rotor 27. At least a portion of the spindle 8 is disposed forward of the speed-reducing mechanism 7. The spindle 8 is disposed rearward of the anvil 10.

The impact mechanism 9 impacts the anvil 10 in the rotational direction using the rotational force of the spindle 8, which is rotated by the motor 6. The rotational force of the motor 6 is transmitted to the impact mechanism 9 via the speed-reducing mechanism 7 and the spindle 8.

The anvil 10 is an output shaft of the impact tool 1, which is rotated by the rotational force of the rotor 27. The anvil 10 is disposed more forward than the motor 6. At least a portion of the anvil 10 is disposed more forward than the spindle 8. The anvil 10 has a hexagonal-bit hole 10A, into which a driver bit (bit) 300 is inserted. The hexagonal-bit hole 10A is provided in a front-end portion of the anvil 10. The driver bit is mounted in the anvil 10.

The bit-holding mechanism 11 holds the driver bit 300 inserted into the hexagonal-bit hole 10A of the anvil 10. The bit-holding mechanism 11 is disposed around a front portion of the anvil 10. The driver bit 300 is mountable in (on) and demountable (removable) from the bit-holding mechanism 11.

The fan 12 generates an airflow for cooling the motor 6 and may be, e.g., a centrifugal fan, an impeller, etc. The fan 12 is disposed more rearward than the stator 26 of the motor 6. The fan 12 is fixed to at least a portion of the rotor 27 so as to rotate together with the rotor 27. When the fan 12 rotates, air from outside of the housing 2 flows into the interior space of the housing 2 via the air-intake openings 19. Air that has flowed into the interior space of the housing 2 flows through the interior space of the housing 2 and thereby cools the motor 6. Air that has flowed through the interior space of the housing 2 flows out to the outside of the housing 2 via the air-exhaust openings 20 while the fan 12 is rotating.

The battery-mounting part 13 is connected to the battery pack 25. The battery pack 25 is mounted on the battery-mounting part 13. The battery pack 25 is detachable from the battery-mounting part 13. The battery-mounting part 13 is disposed on a lower portion of the battery-holding part 23. The battery pack 25 is mounted on the battery-mounting part 13 by being inserted into (slid along) the battery-mounting part 13 from forward of the battery-holding part 23. The battery pack 25 is demounted from the battery-mounting part 13 by being removed (slid) forward from the battery-mounting part 13 in the state in which a lock-release button 25A has been pressed down. The battery pack 25 comprises one or more secondary batteries. In the embodiment, the battery pack 25 comprises one or more rechargeable lithium-ion batteries or another type of rechargeable battery. After being mounted on the battery-mounting part 13, the battery pack 25 can supply electric power (current) to the impact tool 1. The motor 6 is driven using the electric power (current) supplied from the battery pack 25.

The trigger 14 is manipulated (pressed, squeezed) by the user to start the energization of the motor 6. The motor 6 is switched between being driven (energized) and stopped by manipulating the trigger 14. The trigger 14 is provided on the grip part 22.

The forward/reverse-change switch 15 is manipulated (e.g., slid) by the user. By manipulating (sliding) the forward/reverse-change switch 15 from the left to the right or vice versa, the rotational direction of the motor 6 is switched from one of the forward-rotational direction and the reverse-rotational direction to the other. By switching the rotational direction of the motor 6, the rotational direction of the spindle 8 is switched. The forward/reverse-change switch 15 is provided at (through) an upper portion of the grip part 22.

The operation-and-display part 16 comprises a first manipulatable button 16A and a second manipulatable button 16B. When the user manipulates (e.g., presses) the first manipulatable button 16A, the application mode of the motor 6 is switched. The operation-and-display part 16 is provided on the battery-holding part 23. The operation-and-display part 16 is provided on an upper surface of the battery-holding part 23 more on the forward side than the grip part 22. By manipulating the second manipulatable button 16B, the light 17 is turned ON and OFF.

The light 17 emits illumination light. The light 17 illuminates the anvil 10 and around the periphery of the anvil 10 with the illumination light. The light 17 illuminates forward of the anvil 10 with the illumination light. In addition, the light 17 illuminates the driver bit 300, when it is mounted on the anvil 10, and the periphery of the driver bit 300 with the illumination light. The light 17 is disposed upward of the trigger 14.

The controller 18 outputs control signals, which control the motor 6. The controller 18 comprises a control circuit board (e.g., a printed circuit board), on which a plurality of electronic components is installed (mounted). A processor, such as a CPU (central-processing unit or microprocessor); nonvolatile memory, such as ROM (read-only memory) and storage; volatile memory, such as RAM (random-access memory); transistors (e.g., power FETs); and resistors are illustrative examples of the electronic components installed on the board. The controller 18 is housed in the battery-holding part 23.

Figure 6:
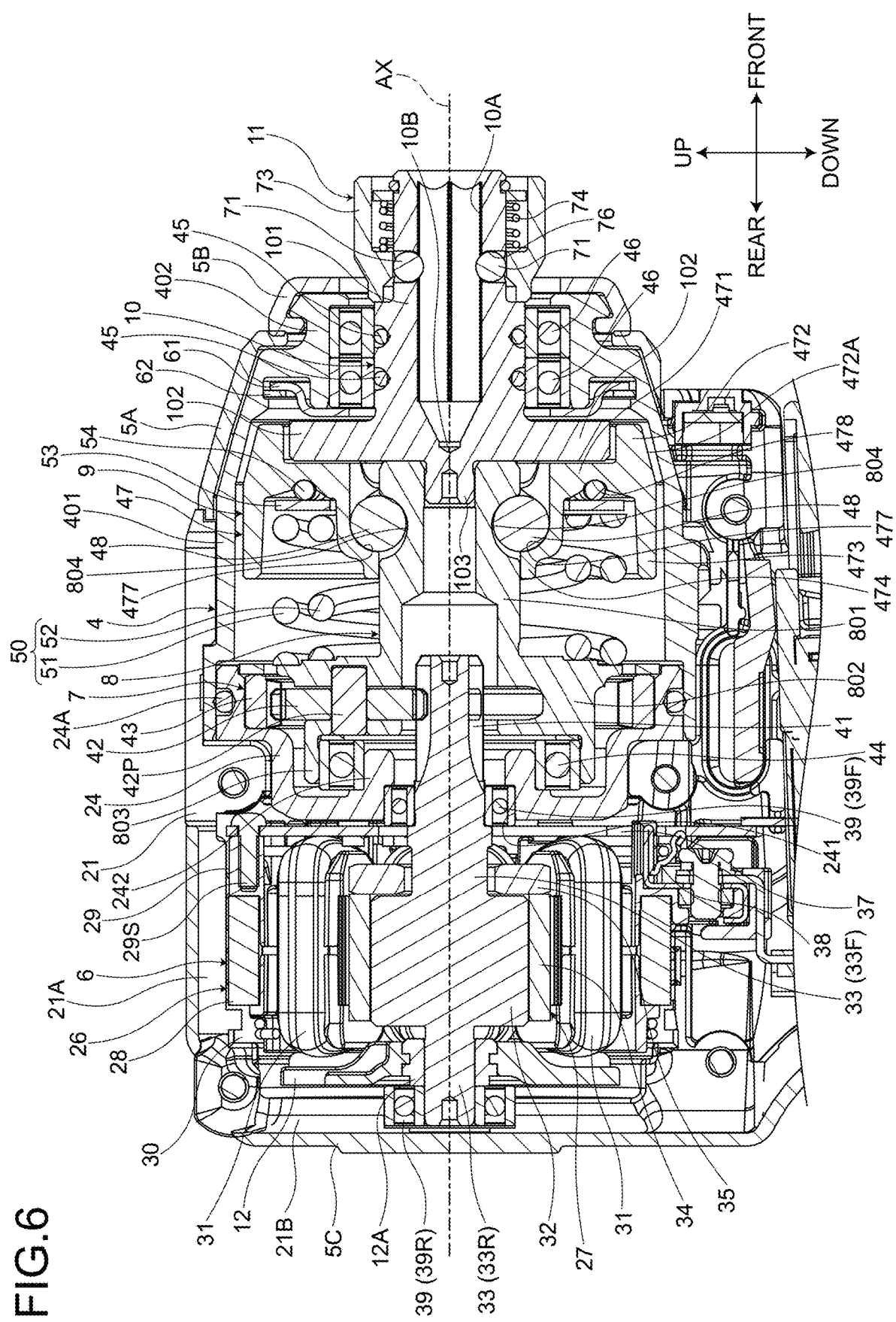
FIG. 6 is a longitudinal, cross-sectional view that shows an upper portion of the impact tool according to the present embodiment.
Figure 7:
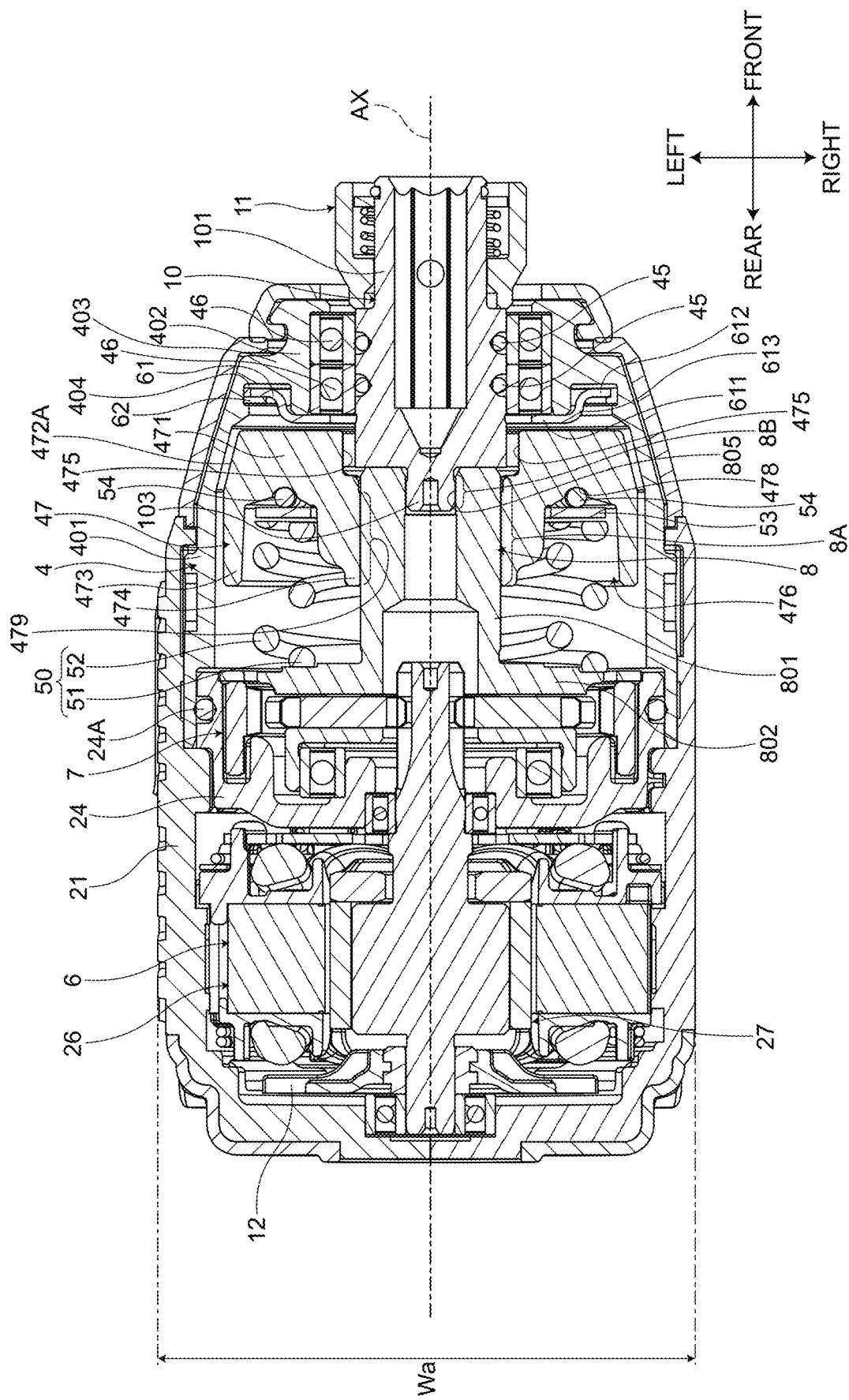
FIG. 7 is a transverse, cross-sectional view that shows an upper portion of the impact tool according to the present embodiment.
Figure 8:
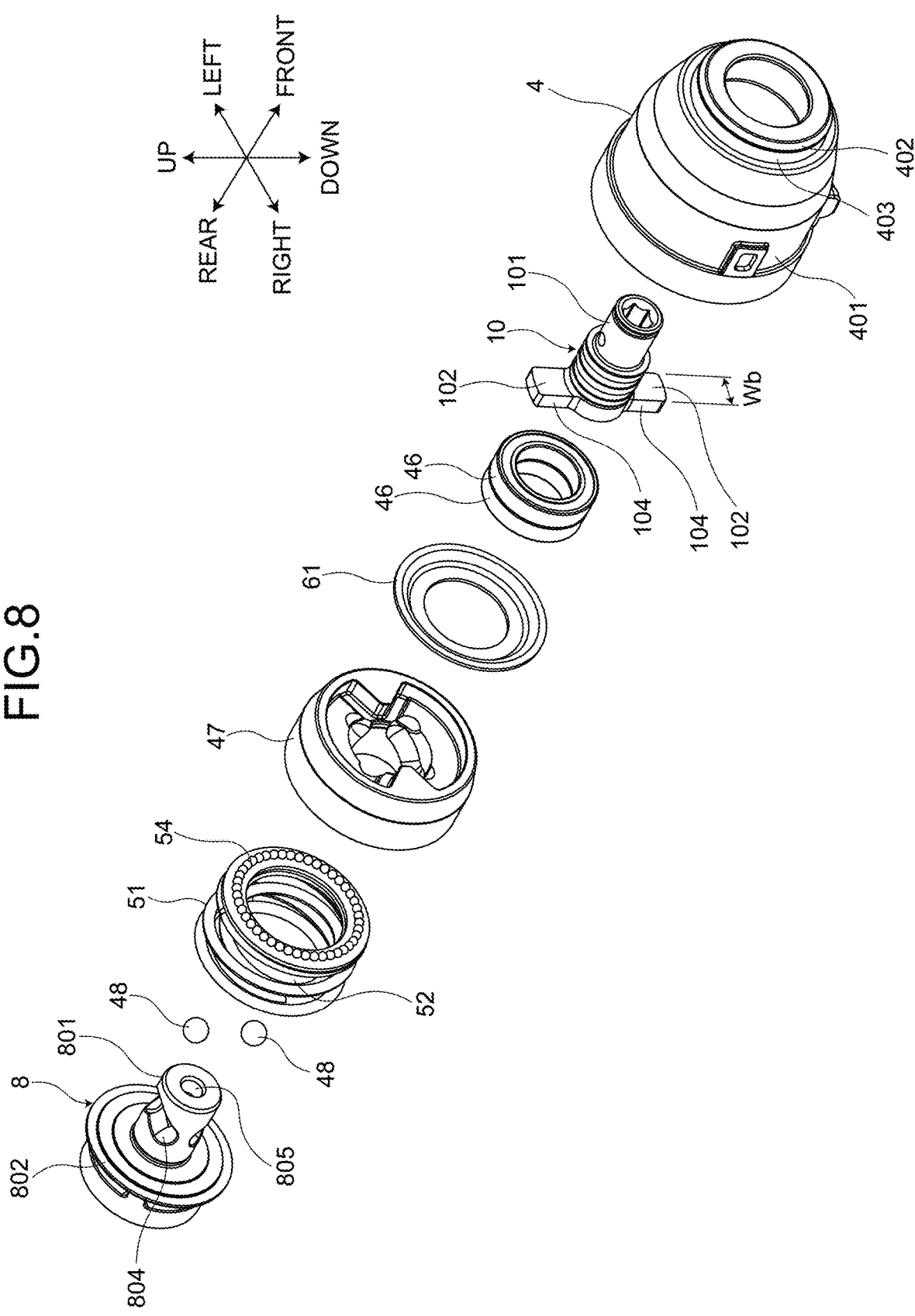
FIG. 8 is an exploded, oblique view, viewed from the front, that shows a portion of the impact tool according to the present embodiment.
Figure 9:
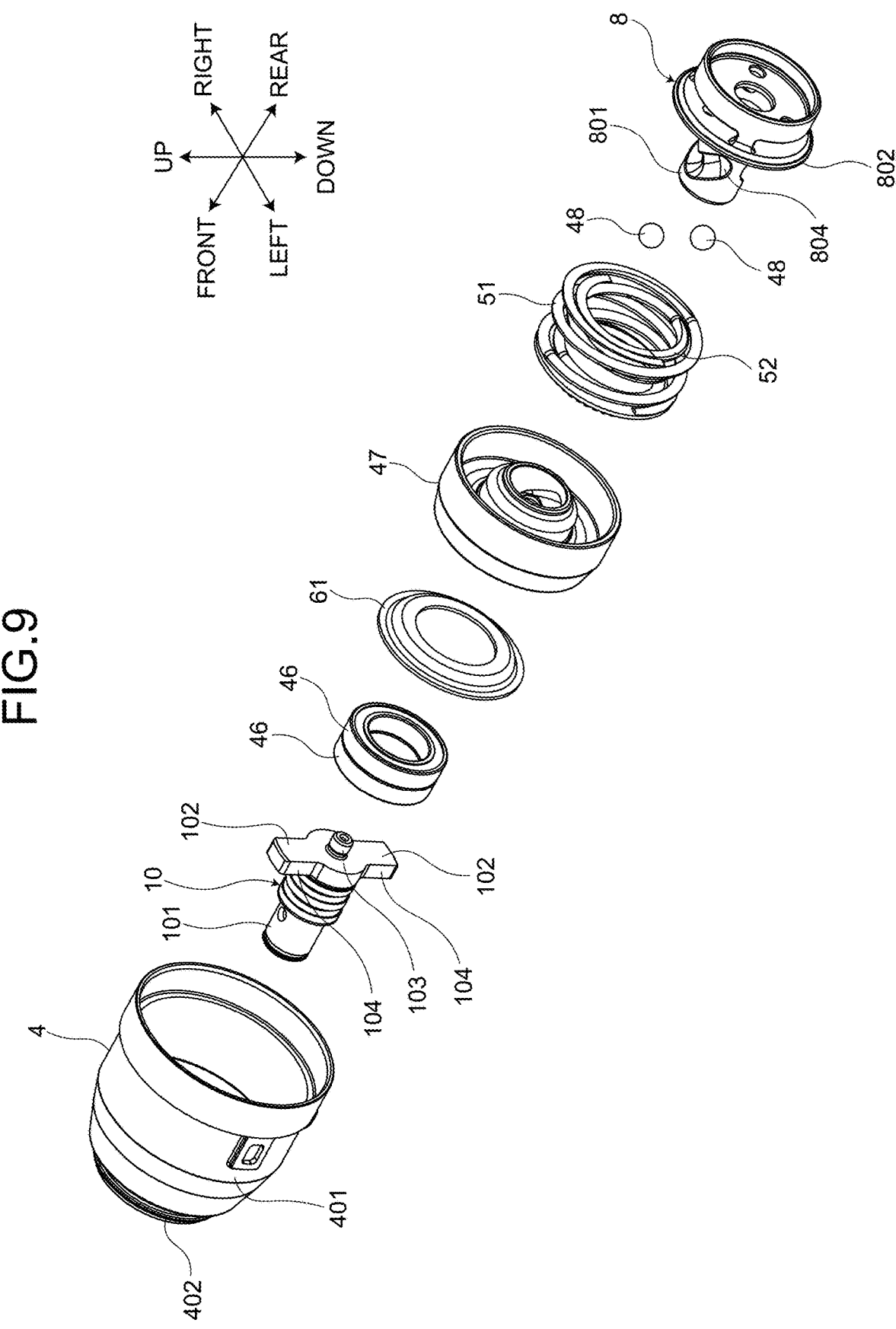
FIG. 9 is an exploded, oblique view, viewed from the rear, that shows a portion of the impact tool according to the present embodiment.

FIG. 6 is a longitudinal, cross-sectional view that shows an upper portion of the impact tool 1 according to the present embodiment. FIG. 7 is a transverse, cross-sectional view that shows an upper portion of the impact tool 1. FIG. 8 is an exploded, oblique view, viewed from the front, that shows a portion of the impact tool 1. FIG. 9 is an exploded, oblique view, viewed from the rear, that shows a portion of the impact tool 1.

The hammer case 4 has a first tube portion 401, a second tube portion 402, and a case-connecting portion 403. The first tube portion 401 is disposed around the impact mechanism 9. The second tube portion 402 is disposed more forward than the first tube portion 401. The outer diameter of the second tube portion 402 is smaller than the outer diameter of the first tube portion 401. The case-connecting portion 403 is disposed so as to connect a front-end portion of the first tube portion 401 and an outer-circumferential surface of the second tube portion 402. A rear-end portion of the second tube portion 402 protrudes rearward from the case-connecting portion 403.

The motor 6 comprises the stator 26 and the rotor 27. The stator 26 comprises a stator core 28, a front insulator 29, a rear insulator 30, and coils 31. The rotor 27 rotates about rotational axis AX. The rotor 27 has a rotor-core portion 32, rotor-shaft portions 33, at least one rotor magnet 34, and at least one sensor magnet 35.

The stator core 28 is disposed radially outward of (surrounding) the rotor 27. The stator core 28 comprises a plurality of laminated steel sheets. Each of the steel sheets is a sheet made of a metal in which iron is the main component. The stator core 28 has a tube shape. The stator core 28 comprises teeth that respectively support the coils 31.

The front insulator 29 is provided at a front portion of the stator core 28. The rear insulator 30 is provided at a rear portion of the stator core 28. The front insulator 29 and the rear insulator 30 are each an electrically insulating member that is made of a synthetic resin (polymer). The front insulator 29 is disposed such that it covers a portion of the surface of each of the teeth. The rear insulator 30 is disposed such that it covers a portion of the surface of each of the teeth.

The coils 31 are mounted on the stator core 28 via the front insulator 29 and the rear insulator 30. The coils 31 are respectively disposed around the teeth of the stator core 28 via the front insulator 29 and the rear insulator 30. The coils 31 and the stator core 28 are electrically insulated from each other by the front insulator 29 and the rear insulator 30. Pairs of the coils 31 are electrically connected to each other via respective fusing terminals 38, which receive drive signals from the controller 18.

The rotor-core portion 32 and the rotor-shaft portions 33 are each made of steel. The rotor-shaft portions 33 protrude in the front-rear direction from end surfaces of the rotor-core portion 32. The rotor-shaft portions 33 include a front-side shaft portion 33F, which protrudes forward from a front-end surface of the rotor-core portion 32, and a rear-side shaft portion 33R, which protrudes rearward from a rear-end surface of the rotor-core portion 32.

The rotor magnet 34 is fixed to the rotor-core portion 32. The rotor magnet 34 has a circular-tube shape. The rotor magnet 34 is disposed around the rotor-core portion 32.

The sensor magnet 35 is fixed to the rotor-core portion 32. The sensor magnet 35 has a circular-ring shape. The sensor magnet 35 is disposed at a front-end surface of the rotor-core portion 32 and front-end surfaces of the rotor magnets 34.

A sensor board 37 is mounted on the front insulator 29. The sensor board 37 is fixed to the front insulator 29 by at least one screw 29S. The sensor board 37 comprises a disk-shaped circuit board, in which a hole is provided at the center, and rotation-detection devices, which are supported on the circuit board. At least a portion of the sensor board 37 opposes the sensor magnet 35. The rotation-detection device detects the location of the rotor 27 in the rotational direction by detecting the location of the sensor magnet 35 of the rotor 27.

The rotor-shaft portions 33 are supported by rotor bearings 39 in a rotatable manner. The rotor bearings 39 include a front-side rotor bearing 39F, which supports the front-side shaft portion 33F in a rotatable manner, and a rear-side rotor bearing 39R, which supports the rear-side shaft portion 33R in a rotatable manner.

The front-side rotor bearing 39F is held by the bearing box 24. The bearing box 24 has a recessed portion 241, which is recessed forward from a rear surface of the bearing box 24. The front-side rotor bearing 39F is disposed in the recessed portion 241. The rear-side rotor bearing 39R is held by the rear-plate part 21B. A front-end portion of the front-side shaft portion 33F is disposed (inserted) in the interior space of the hammer case 4 via (through) an opening in the bearing box 24.

The fan 12 is fixed to a rear portion of the rear-side shaft portion 33R via a bushing 12A. The fan 12 is disposed between the rear-side rotor bearing 39R and the stator 26. The fan 12 rotates when the rotor 27 rotates. Thus, when the rotor-shaft portions 33 rotates, the fan 12 rotates together with the rotor-shaft portions 33.

A pinion gear 41 is formed at (on) a front-end portion of the front-side shaft 33F. The pinion gear 41 is coupled to at least a portion of the speed-reducing mechanism 7. The front-side shaft portion 33F is coupled to the speed-reducing mechanism 7 via the pinion gear 41.

The speed-reducing mechanism 7 comprises a plurality of (e.g., three) planet gears 42 disposed around the pinion gear 41 and an internal gear 43 disposed around the plurality of planet gears 42. The pinion gear 41, the planet gears 42, and the internal gear 43 are each housed in the hammer case 4. Each of the planet gears 42 meshes with the pinion gear 41. The planet gears 42 are supported in a rotatable manner by the spindle 8 via respective pins 42P. The spindle 8 is rotated by the planet gears 42, because the pins 42P are fixedly attached to a flange portion 802 of the spindle 8 (see FIGS. 6-8). The internal gear 43 has radially-inward facing teeth, which mesh with the radially-outward facing teeth of the planet gears 42. The internal gear 43 is rotatably fixed to the bearing box 24. The internal gear 43 is always non-rotatable relative to the bearing box 24. More specifically, the bearing box 24 is rotatably fixed to the left housing 2L and the right housing 2R.

When the rotor-shaft portions 33 rotate in response to the driving (energization) of the motor 6, the pinion gear 41 rotates, and the planet gears 42 revolve (orbit) around the pinion gear 41. More specifically, the planet gears 42 revolve (orbit) around the pinion gear 41 while meshing with the inner teeth of the internal gear 43. Owing to the revolving of the planet gears 42, the spindle 8, which is connected to the planet gears 42 via the pins 42P, rotates at a rotational speed that is lower than the rotational speed of the rotor-shaft portions 33, but at a higher torque.

Thus, the rotational force of the motor 6 is transmitted to the spindle 8 so that the spindle 8 rotates. Thereafter, the spindle 8 transmits the rotational force of the motor 6 to the anvil 10 via the impact mechanism 9. The spindle 8 comprises a spindle-shaft portion 801 and the flange portion 802, which is provided on a rear portion of the spindle-shaft portion 801. As was noted above, the planet gears 42 are supported on the flange portion 802 in a rotatable manner via the respective pins 42P. The rotational axis of the spindle 8 and rotational axis AX of the motor 6 coincide with each other; i.e. they are colinear. The spindle 8 rotates about rotational axis AX. The spindle 8 is supported by a spindle bearing 44 in a rotatable manner. A protruding portion 803 is provided on a rear-end portion of the spindle 8. The protruding portion 803 protrudes rearward from the flange portion 802. The protruding portion 803 is disposed so as to surround the spindle bearing 44.

The bearing box 24 is disposed at least partly around the spindle 8. The spindle bearing 44 is held in the bearing box 24. The bearing box 24 has a protruding portion 242, which protrudes forward from a front surface of the bearing box 24. The spindle bearing 44 is disposed around the protruding portion 242.

The impact mechanism 9 comprises a hammer 47, hammer balls 48, coil springs 50, and a washer 53. The impact mechanism 9, which comprises the hammer 47, the hammer balls 48, the coil springs 50, and the washer 53, is housed in the first tube portion 401 of the hammer case 4. The first tube portion 401 is disposed around the hammer 47.

The hammer 47 is disposed more forward than the speed-reducing mechanism 7. The hammer 47 is disposed around the spindle-shaft portion 801. The hammer 47 is supported on the spindle-shaft portion 801.

The hammer 47 is rotated by the spindle 8 using the rotational force generated by the motor 6. More specifically, the rotational force of the motor 6 is transmitted to the hammer 47 via the speed-reducing mechanism 7 and the spindle 8. The hammer 47 is rotatable, together with the spindle 8, using the rotational force of the spindle 8, which is rotated by the motor 6. The rotational axis of the hammer 47, the rotational axis of the spindle 8, and rotational axis AX of the motor 6 coincide with each other; i.e. they are colinear. The hammer 47 rotates about rotational axis AX. The hammer 47 drives and/or impacts the anvil 10 in the rotational direction.

Figure 10:
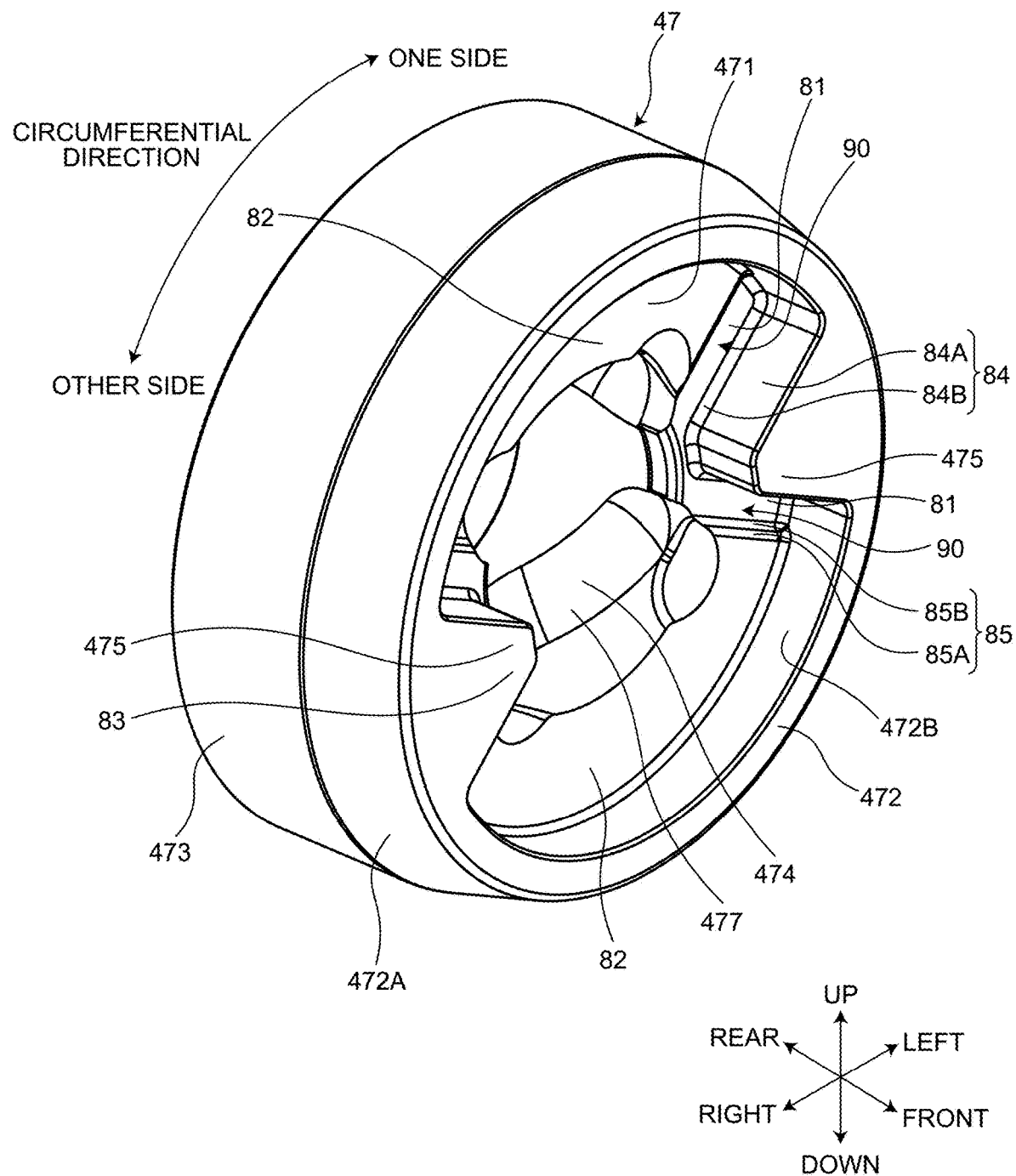
FIG. 10 is an oblique view, viewed from the front, that shows a hammer according to the present embodiment.
Figure 11:
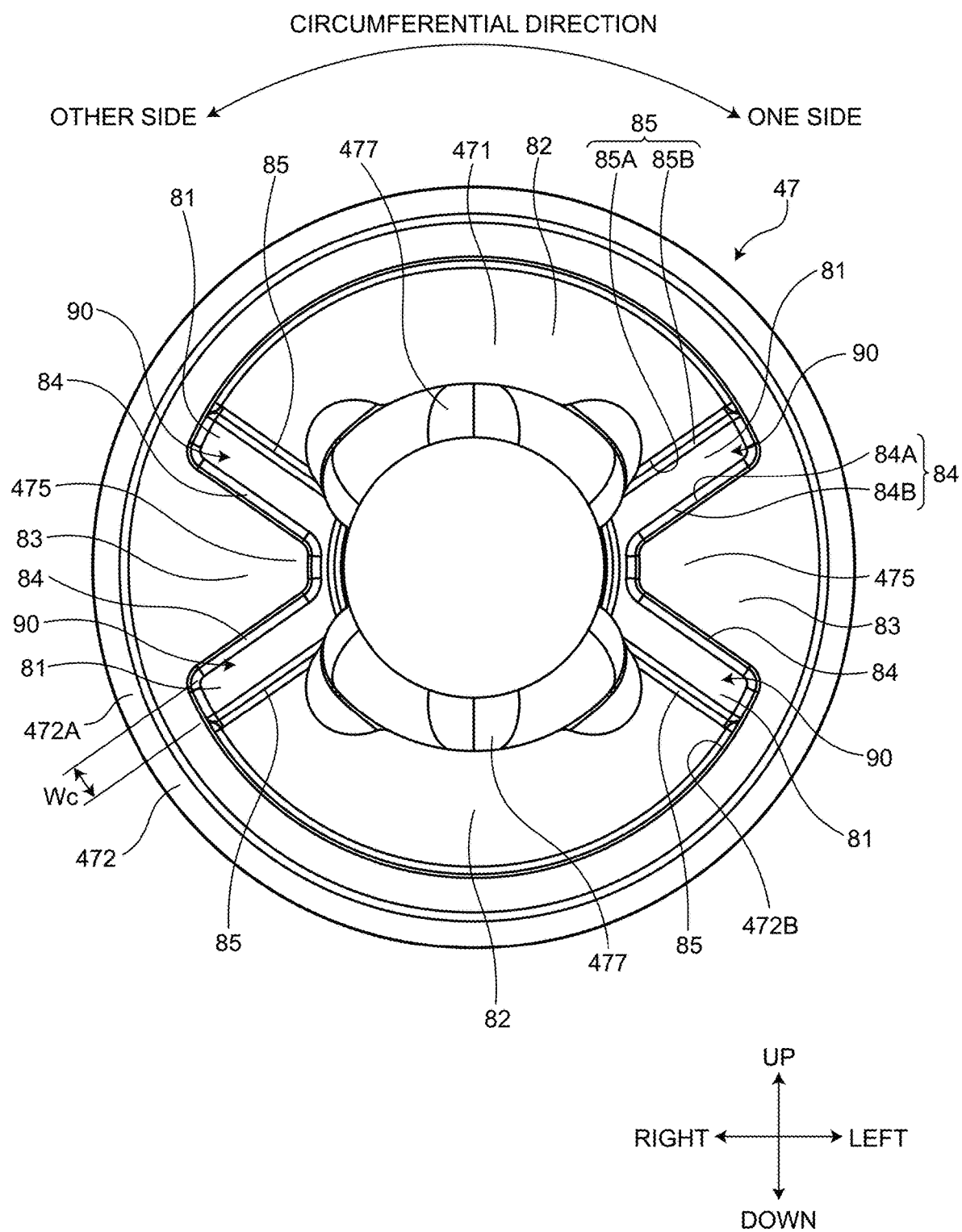
FIG. 11 is a drawing, viewed from the front, that shows the hammer according to the present embodiment.
Figure 12:
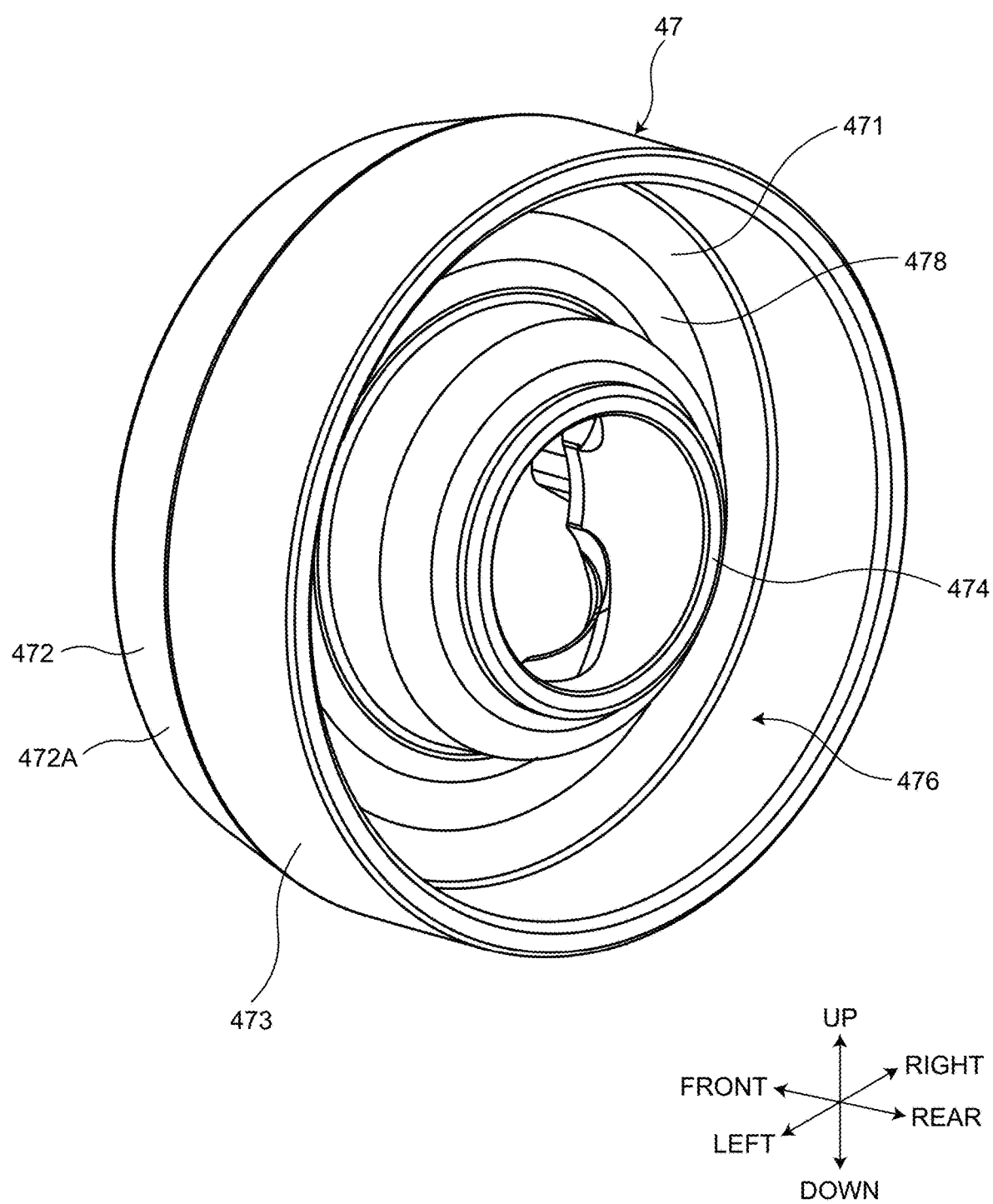
FIG. 12 is an oblique view, viewed from the rear, that shows the hammer according to the present embodiment.
Figure 13:
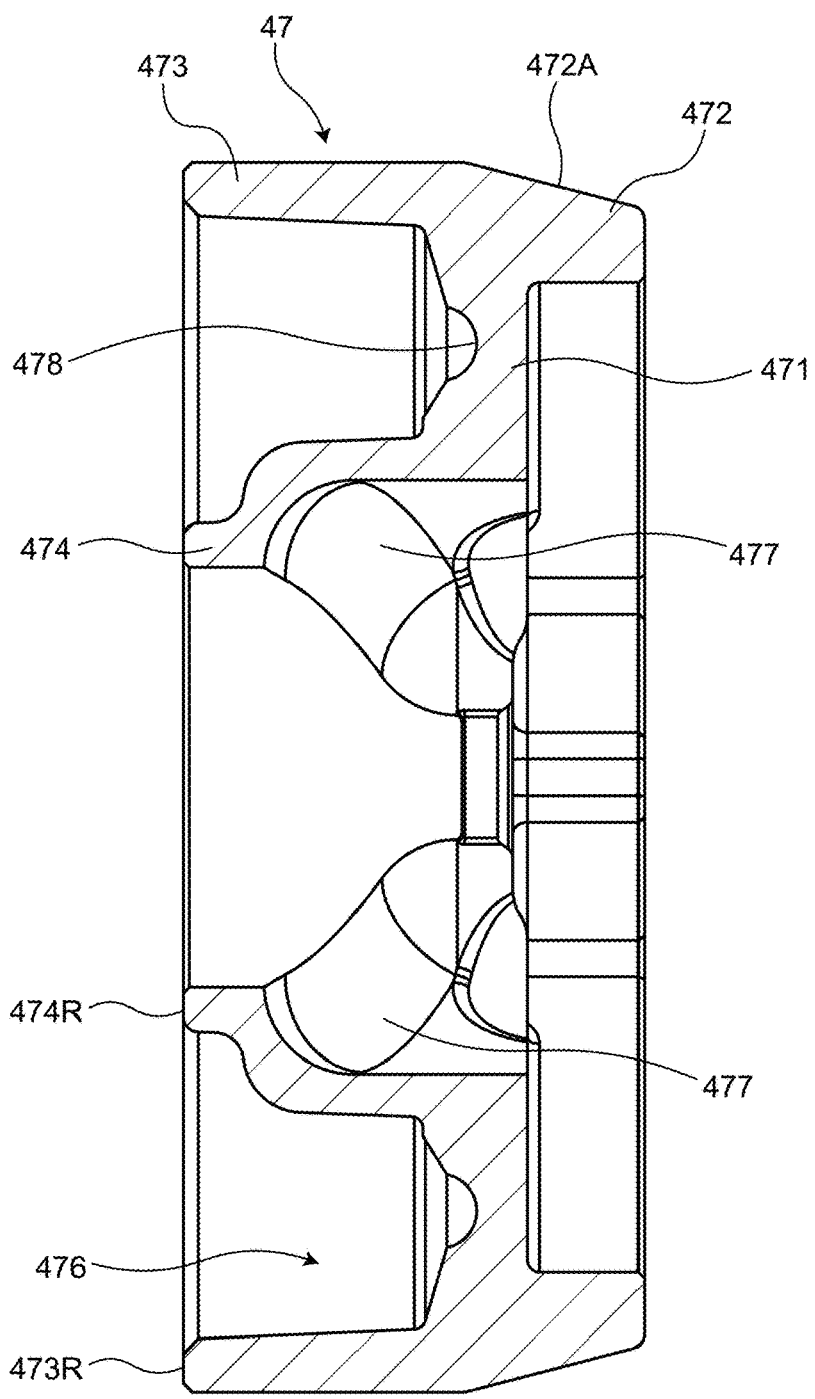
FIG. 13 is a longitudinal, cross-sectional view that shows the hammer according to the present embodiment.

FIG. 10 is an oblique view, viewed from the front, that shows the hammer 47 according to the present embodiment. FIG. 11 is a drawing, viewed from the front, of the hammer 47. FIG. 12 is an oblique view, viewed from the rear, that shows the hammer 47. FIG. 13 is a longitudinal, cross-sectional view that shows the hammer 47. FIG. 14 is a transverse, cross-sectional view that shows the hammer 47.

The hammer 47 has a base portion 471, a front-side ring portion 472, a rear-side ring portion 473, a support-ring portion (plain bearing portion) 474, and hammer-projection portions 475.

The base portion 471 is disposed around the spindle-shaft portion 801 (see e.g., FIG. 8). The base portion 471 is ring shaped. The spindle-shaft portion 801 is disposed in (extends through) the interior of the base portion 471 (see e.g., FIG. 7).

The front-side ring portion 472 protrudes forward from an outer-circumferential portion of the base portion 471. The front-side ring portion 472 is tube shaped. An outer-circumferential surface 472A of the front-side ring portion 472 faces forward and is sloped radially inward.

The rear-side ring portion 473 protrudes rearward from an outer-circumferential portion of the base portion 471. The rear-side ring portion 473 is tube shaped.

The support-ring portion 474 protrudes rearward from an inner-circumferential portion of the base portion 471. The support-ring portion 474 is tube shaped. The support-ring portion 474 is disposed around the spindle-shaft portion 801. The support-ring portion 474 is supported on the spindle-shaft portion 801 via the hammer balls 48.

The hammer-projection portions 475 protrude radially inward from an inner-circumferential surface 472B of the front-side ring portion 472. The hammer-projection portions 475 protrude forward from a front surface of the base portion 471. Front surfaces 83 of the hammer-projection portions 475 are disposed more forward than the front surface of the base portion 471. The front surface of the front-side ring portion 472 and the front surfaces 83 of the hammer-projection portions 475 are disposed within the same plane (coplanar). Two of the hammer-projection portions 475 are disposed in the circumferential direction.

As can be seen in FIG. 12, a recessed portion 476 is formed by a rear surface of the base portion 471, an inner-circumferential surface of the rear-side ring portion 473, and an outer-circumferential surface of the support-ring portion 474. The recessed portion 476 is formed so as to be recessed forward from a rear surface of the hammer 47.

As shown in FIG. 13 and FIG. 14, the location of a rear-end portion 473R of the rear-side ring portion 473 and the location of a rear-end portion 474R of the support-ring portion 474 are the same in the front-rear direction.

As can be seen in FIG. 10 and FIG. 11, the base portion 471 has grooves 90, which are provided (defined) at the boundaries between the base portion 471 and the hammer-projection portions 475. The grooves 90 extend radially. The grooves 90 are provided on each of one side in the circumferential direction and on the other side in the circumferential direction of each of the hammer-projection portions 475.

The front surface of the base portion 471 includes first side surfaces (first planar surface) 81 and second side surfaces (second planar surface) 82, which are disposed at locations different from those of the first side surfaces 81 in the circumferential direction. The second side surfaces 82 are disposed more forward than the first side surfaces 81.

One edge portion of each of the first side surfaces 81 in the circumferential direction is connected to a corresponding edge portion of the front surface 83 of the corresponding hammer-projection portion 475 in the circumferential direction via a first connecting surface 84. One edge portion of each of the second side surfaces 82 in the circumferential direction is connected to a corresponding edge portion of the corresponding first side surface 81 in the circumferential direction via a second connecting surface 85. Each of the grooves 90 provided on the other side in the circumferential direction of each of the hammer-projection portions 475 is defined by the corresponding first side surface 81, the first connecting surface 84 connected to one edge portion of the corresponding first side surface 81 in the circumferential direction, and the second connecting surface 85 connected to a corresponding edge portion of the corresponding first side surface 81 in the circumferential direction.

Each of the grooves 90 provided on the one side in the circumferential direction of each of the hammer-projection portions 475 is defined by the corresponding first side surface 81, the first connecting surface 84 connected to the corresponding edge portion of the corresponding first side surface 81 in the circumferential direction, and the second connecting surface 85 connected to one edge portion of the corresponding first side surface 81 in the circumferential direction.

Each of the first connecting surfaces 84 includes a first flat surface 84A and a first curved surface 84B. The first flat surfaces 84A are parallel to rotational axis AX of the hammer 47. The first flat surfaces 84A are disposed so as to extend substantially, but not exactly radially. In the groove 90 provided on the other side in the circumferential direction of each of the hammer-projection portions 475, the corresponding first curved surface 84B is disposed so as to connect, in the circumferential direction, a rear-edge portion of the corresponding first flat surface 84A and one edge portion of the corresponding first side surface 81. In the groove 90 provided on one side in the circumferential direction of each of the hammer-projection portions 475, the corresponding first curved surface 84B is disposed so as to connect, in the circumferential direction, a rear-edge portion of the corresponding first flat surface 84A and the corresponding edge portion of the corresponding first side surface 81.

Each of the second connecting surfaces 85 includes a second flat surface 85A and a second curved surface 85B. The second flat surfaces 85A are parallel to rotational axis AX of the hammer 47. The second flat surfaces 85A are disposed so as to extend substantially, but not exactly radially. In each one of the grooves 90, the corresponding second flat surface 85A is disposed so as to oppose (face, extend in parallel with) the corresponding first flat surface 84A. In the groove 90 provided on the other side in the circumferential direction of each of the hammer-projection portions 475, the second curved surface 85B is disposed so as to connect, in the circumferential direction, a rear-edge portion of the corresponding second flat surface 85A and the corresponding edge portion of the corresponding first side surface 81. In the groove 90 provided on one side in the circumferential direction of each of the hammer-projection portions 475, the corresponding second curved surface 85B is disposed so as to connect, in the circumferential direction, a rear-edge portion of the corresponding second flat surface 85A and the one edge portion of the corresponding first side surface 81.

As can be seen in FIG. 6 and FIGS. 8-9, the hammer balls 48 are made of a metal such as steel. The hammer balls 48 are disposed between the spindle-shaft portion 801 and the hammer 47. The spindle 8 has spindle grooves 804, in each of which at least a portion of the corresponding hammer ball 48 is disposed. The spindle grooves 804 are provided in portions of an outer-circumferential surface of the spindle-shaft portion 801. The hammer 47 has hammer grooves 477 (see e.g., FIG. 13), in each of which at least a portion of the corresponding hammer ball 48 is disposed. The hammer grooves 477 are provided in portions of an inner-circumferential surface of the support-ring portion 474. The hammer balls 48 are disposed between the spindle grooves 804 and the hammer grooves 477. The hammer balls 48 can roll along the inner sides of the spindle grooves 804 and the inner sides of the hammer grooves 477. The hammer 47 is movable together with the hammer balls 48. The spindle 8 and the hammer 47 can move relative to each other in both the axial direction and the rotational direction within a movable range defined by the spindle grooves 804 and the hammer grooves 477.

Referring again to FIGS. 6-7, the coil springs 50 are disposed around the spindle-shaft portion 801. In the present embodiment, the coil springs 50 comprise a first coil spring 51 and a second coil spring 52, which are disposed concentrically (coaxially). The second coil spring 52 is disposed radially inward of the first coil spring 51. The coil springs 51, 52 are preferably each a compression spring.

A rear-end portion of the first coil spring 51 and a rear-end portion of the second coil spring 52 are supported on the flange portion 802. A front-end portion of the first coil spring 51 and a front-end portion of the second coil spring 52 are disposed inside the recessed portion 476 (see also FIG. 12). The washer 53 (see also FIG. 14) is disposed inside the recessed portion 476. A front-end portion of the first coil spring 51 and a front-end portion of the second coil spring 52 are supported by the washer 53. The washer 53 is ring shaped. The first coil spring 51 and the second coil spring 52 each continuously generate an elastic (spring) force, which causes (urges) the hammer 47 to move forward.

The washer 53 is disposed rearward of the base portion 471. The washer 53 supports front-end portions of the coil springs 50 (51, 52). The washer 53 is disposed between the rear-side ring portion 473 and the support-ring portion 474 in the radial direction. Because the washer 53 is disposed inside the recessed portion 476, the washer 53 is supported by the hammer 47 via a plurality of support balls 54 (see also FIG. 8). In the state in which the hammer 47 is disposed most forward within the movable range of the hammer 47 in the front-rear direction, the washer 53 is disposed more forward than a rear-end portion of each of the hammer balls 48.

The support balls 54 are disposed in a support groove (bearing groove) 478, which is provided in a rear surface of the base portion 471, as can also be seen in FIGS. 12-13. The support balls 54 support a front surface of the washer 53. The support groove 478 is provided in a ring shape so as to surround rotational axis AX.

The location of the support groove 478 and the location of at least a portion of each of the second side surfaces 82 are the same in both the radial direction and the circumferential direction. The base portion 471 has thin-wall portions, in which the grooves 90 are provided, and a thick-wall portion, in which the grooves 90 are not provided. The thin-wall portions include the first side surfaces 81. The thick-wall portion includes the second side surfaces 82. The support groove 478 is provided in the thick-wall portion of the base portion 471.

As can be seen in FIGS. 8-9, the anvil 10 has an anvil-shaft portion 101, anvil-projection portions 102, and an anvil-protruding portion 103.

The anvil-shaft portion 101 is disposed more forward than the spindle 8 and the hammer 47. The driver bit 300 is mountable in the anvil-shaft portion 101. The hexagonal-bit hole 10A, into which the driver bit 300 can be inserted, is provided so as to extend rearward from a front-end portion of the anvil-shaft portion 101, as can be seen in FIGS. 5-6.

As shown in FIG. 6, in the front-rear direction, a rear-end portion 10B of the hexagonal-bit hole 10A is disposed at the same location as at least a portion of the front-side ring portion 472. In other words, a portion of the hammer 47 radially surrounds the rear-end portion (10B) of the hexagonal-bit hole 10A. It is noted that the rear-end portion 10B of the hexagonal-bit hole 10A may be disposed at the same location as at least a portion of the base portion 471. Thereby, the overall length (axial length), which is the distance in the front-rear direction between a rear-end portion of the rear-plate part 21B and a front-end portion of the anvil 10, can be reduced.

The anvil-projection portions 102 protrude radially outward from a rear portion of the anvil-shaft portion 101. The anvil-projection portions 102 are impacted in the rotational direction by the hammer-projection portions 475. The anvil-projection portions 102 have impacted surfaces 104, which are impacted by the hammer-projection portions 475. The impacted surfaces 104 are (extend) parallel to rotational axis AX of the anvil 10. At least a portion of each of the first flat surfaces 84A of each of the hammer-projection portions 475 opposes the impacted surface 104 of the corresponding anvil-projection portion 102.

The front-side ring portion 472 is disposed more radially outward than the anvil-projection portions 102. In the axial direction, the location of the front-side ring portion 472 and the location of at least a portion of each of the anvil-projection portions 102 are the same. An outer-circumferential portion of each of the anvil-projection portions 102 and an inner-circumferential portion of the front-side ring portion 472 are spaced apart from each other.

The base portion 471 is disposed more rearward than the anvil-projection portions 102. The rear surfaces of the anvil-projection portions 102 and the front surface of the base portion 471 are spaced apart from each other.

As can be seen in FIG. 9, the anvil-protruding portion 103 protrudes rearward from a rear-end portion of the anvil 10. As can be seen in FIG. 8, the spindle 8 is disposed rearward of the anvil 10. A spindle-recessed portion (blind hole) 805 is provided in a front-end portion of the spindle-shaft portion 801. As can be seen in FIGS. 6-7, the anvil-protruding portion 103 is disposed in the spindle-recessed portion 805.

As shown in FIG. 7, at least a portion of an outer-circumferential surface of the spindle-shaft portion 801 is a hammer-sliding surface (plain bearing surface having a first axial length) 8A, on which the support-ring portion (plain bearing portion) 474 of the hammer 47 slides. At least a portion of an inner-circumferential surface of the spindle-recessed portion 805 is an anvil-sliding surface (plain bearing surface having a second axial length) 8B, on which the anvil-protruding portion 103 of the anvil 10 slides. The anvil-sliding surface 8B is disposed more radially inward than the hammer-sliding surface 8A. The hammer-sliding surface 8A overlaps at least a portion of the anvil-sliding surface 8B in the front-rear direction; in other words, at least a portion of first axial length of the hammer-sliding surface 8A overlaps at least a portion of second axial length of the of the anvil-sliding surface 8B. In the front-rear direction, because the location of the hammer-sliding surface 8A and the location of at least a portion of the anvil-sliding surface 8B at least partially overlap, the overall length (axial length), which is the distance in the front-rear direction between a rear-end portion of the rear-plate part 21B and a front-end portion of the anvil 10, can be reduced.

As shown in FIG. 7 and FIG. 14, at least a portion of an inner-circumferential surface of the support-ring portion 474 of the hammer 47 is a slid-on (plain bearing, sliding) surface 479, on which the hammer-sliding surface 8A of the spindle-shaft portion 801 slides. The slid-on surface 479 is circular cylindrical shaped. A front-end portion of the slid-on surface 479 is disposed more forward than the washer 53. By disposing at least a portion of the slid-on surface 479 more forward than the washer 53, the dimension of the hammer 47 in the front-rear direction can be reduced.

The anvil 10 is supported in a rotatable manner by anvil bearings 46 (see also FIGS. 8-9). The rotational axis of the anvil 10, the rotational axis of the hammer 47, the rotational axis of the spindle 8, and rotational axis AX of the motor 6 coincide with each other; i.e. they are colinear. The anvil 10 rotates about rotational axis AX. The anvil bearings 46 are disposed around the anvil-shaft portion 101. The anvil bearings 46 are disposed in the interior of the second tube portion 402 of the hammer case 4. The anvil bearings 46 are held in the second tube portion 402 of the hammer case 4. The anvil bearings 46 support a front portion of the anvil-shaft portion 101 in a rotatable manner. O-rings 45 are disposed between the anvil bearings 46 and the anvil-shaft portion 101. The O-rings 45 make contact with both an outer-circumferential portion of the anvil-shaft portion 101 and inner-circumferential portions of the anvil bearings 46.

In the present embodiment, two of the anvil bearings 46 are disposed in the axial direction. Two of the O-rings 45 are disposed in the axial direction.

The hammer-projection portions 475 are contactable with (abutable on) the anvil-projection portions 102. In the state in which the hammer 47 and the anvil-projection portions 102 are in continuous contact with each another, the anvil 10 rotates together with the hammer 47 and the spindle 8 while the motor 6 is being energized (supplied with current).

However, at higher loads, the anvil 10 is also impactable (strikable) in the rotational direction by the hammer 47. For example, during screw-tightening work, there are situations in which, when the load that acts on the anvil 10 becomes high (exceeds a torque threshold), the anvil 10 can no longer be caused to rotate merely by the load (biasing force) applied by the coil springs 50. When the anvil 10 can no longer be caused to rotate merely by the load of the coil springs 50, the rotation of the anvil 10 and the hammer 47 will temporarily stop. Then, because the spindle 8 continues to rotate as long as the motor 6 is driven (energized), the spindle 8 and the hammer 47 can move relative to each another in the axial direction and the circumferential direction via the hammer balls 48. In the state in which the rotation of the hammer 47 has temporarily stopped but the spindle 8 continues to rotate relative to the hammer 47, the hammer balls 48 will move rearward while being guided by the spindle grooves 804 and the hammer grooves 477. The hammer 47 receives a force from the hammer balls 48 and moves rearward along with the hammer balls 48. That is, in the state in which the rotation of the anvil 10 is temporarily stopped, the hammer 47 moves rearward in response to the relative rotation of the spindle 8. The contact between the hammer 47 and the anvil-projection portions 102 is released by the movement of the hammer 47 rearward.

As described above, the coil springs 50 continuously generate an elastic (spring) force, which causes (urges) the hammer 47 to move forward. The hammer 47, which had previously moved rearward, now moves forward owing to the elastic force of the coil springs 50. When the hammer 47 moves forward, it receives a force in the rotational direction from the hammer balls 48. That is, the hammer 47 moves forward while rotating. When the hammer 47 moves forward while rotating, the hammer-projection portions 475 make contact with (abut on, i.e. impact or hammer) the anvil-projection portions 102 while rotating. Thereby, the anvil-projection portions 102 are impacted (hammered) in the rotational direction by the hammer-projection portions 475. Both the power of the motor 6 and the inertial force of the hammer 47 act on the anvil 10. Accordingly, the anvil 10 can be rotated about (around) rotational axis AX with high torque.

As can be seen in FIGS. 6-7, the bit-holding mechanism 11 comprises balls 71, a sleeve 73, and a coil spring 74.

The anvil-shaft portion 101 has support-recessed portions (sides of hole) 76, which support (constrain, guide) the balls 71. The support-recessed portions 76 are formed in an outer surface of the anvil-shaft portion 101. In the present embodiment, two of the support-recessed portions 76 are formed in the anvil-shaft portion 101.

The balls 71 are supported by the anvil 10 in a movable manner. The balls 71 are disposed in the support-recessed portions 76. One of the balls 71 is disposed in each one of the support-recessed portions 76.

Through holes (preferably, radially extending through holes), which connect inner surfaces of the support-recessed portions 76 and an inner surface of the hexagonal-bit hole 10A, are formed in the anvil-shaft portion 101. The diameter of the balls 71 is smaller than the diameter of the through holes (slotted holes). In the state in which the balls 71 are supported by the support-recessed portions 76, at least a portion of each of the balls 71 is disposed in the interior of the hexagonal-bit hole 10A. The balls 71 can fix the driver bit, which has been inserted into the hexagonal-bit hole 10A. The balls 71 are movable to an engaged position, at which the driver bit 300 is fixed, and to a released position, at which the fixing of the driver bit 300 is released (i.e. the driver bit 300 can be removed from the anvil-shaft portion 101).

The sleeve 73 is a circular-tube-shaped member. The sleeve 73 is disposed around the circumference of the anvil-shaft portion 101. The sleeve 73 is movable axially along the circumference of the anvil-shaft portion 101 to a blocking position, at which movement of the balls 71 radially outward is blocked, and a permitting position, at which movement of the balls 71 radially outward is permitted; i.e. at the permitting position of the sleeve 73, the balls 71 are released to move radially so that a portion of the balls 71 extends radially outward of the outer circumference of the anvil-shaft portion 101.

By disposing (axially sliding) the sleeve 73 at (to) the blocking position, movement of the balls 71 radially outward is obstructed (blocked). That is, by disposing (sliding) the sleeve 73 at (to) the blocking position, the driver bit 300 is held in the anvil-shaft portion 101 by the balls 71 because the balls 71 engage in corresponding recesses in the driver bit 300.

On the other hand, by moving (axially sliding) the sleeve 73 to the permitting position, movement of the balls 71 radially outward is permitted (is not blocked). Therefore, by disposing the sleeve 73 at the permitting position, the driver bit 300 is no longer fixed (held) by the balls 71 so that the driver bit 300 can be removed (withdrawn) from the anvil-shaft portion 101.

The coil spring 74 generates an elastic (spring) force so as to move the sleeve 73 toward the blocking position. The coil spring 74 is disposed around the anvil-shaft portion 101. The blocking position is defined more rearward than the permitting position. The coil spring 74 generates an elastic force that causes the sleeve 73 to move rearward.

Referring to FIGS. 6-9 and 15 of the present embodiment, the impact tool 1 comprises a cup washer 61, which is for obstructing (blocking, shielding) contact between the anvil-projection portions 102 and the hammer case 4. In the present embodiment, the cup washer 61 obstructs (blocks, shields) contact between front surfaces of the anvil-projection portions 102 and a rear-end portion of the second tube portion 402. The second tube portion 402 receives a load from the anvil-projection portions 102 via the cup washer 61.

The cup washer 61 is supported in the hammer case 4. In the present embodiment, an outer-circumferential portion of the cup washer 61 is disposed in a groove portion 404, which is provided on an inner-circumferential surface of the first tube portion 401, as can be seen in FIG. 7. In addition, the impact tool 1 comprises a restraining member 62, which restrains (holds, blocks) the cup washer 61 from coming out of the groove portion 404 rearward.

Figure 15:
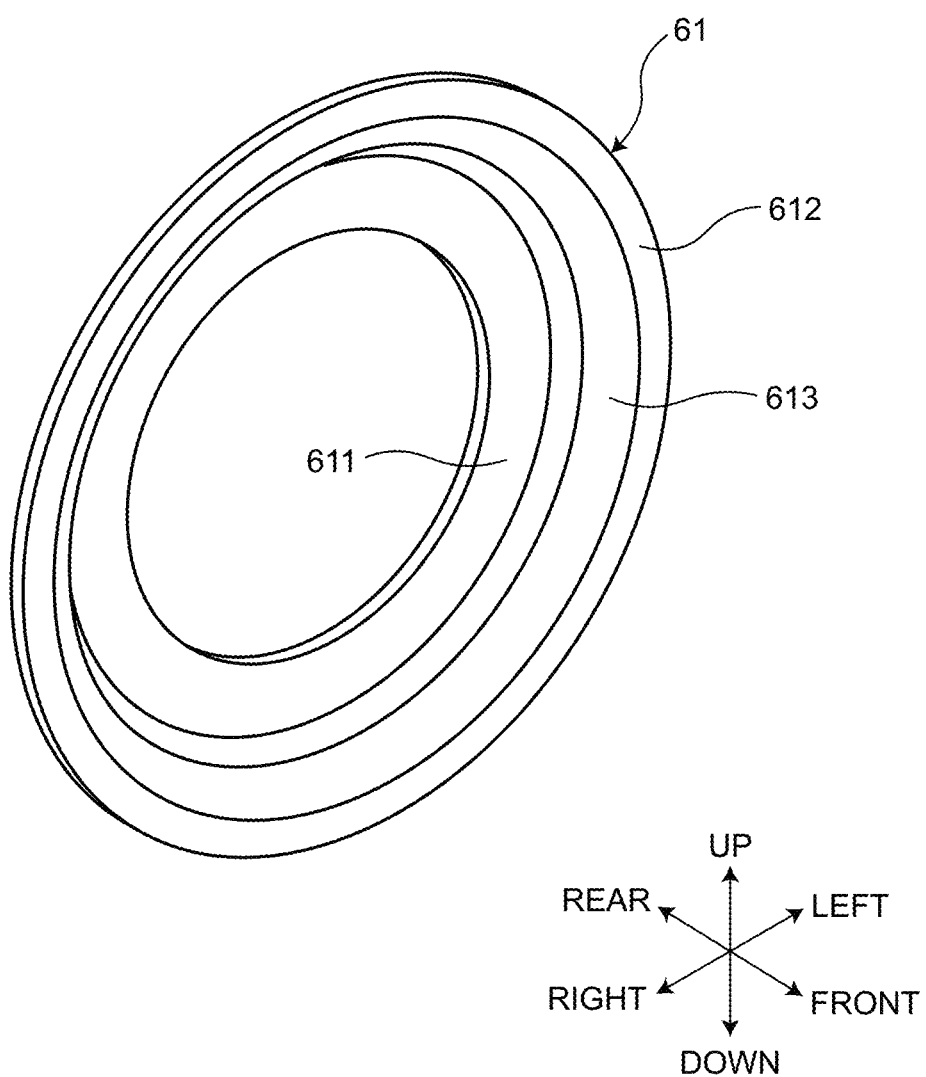
FIG. 15 is an oblique view, viewed from the front, that shows a cup washer according to the present embodiment.

FIG. 15 is an oblique view, viewed from the front, that shows the cup washer 61 according to the present embodiment. The cup washer 61 has an inner-side ring portion 611, an outer-side ring portion 612, and a connecting-ring portion 613.

The inner-side ring portion 611 is disposed so as to oppose the front surfaces of the anvil-projection portions 102. The inner-side ring portion 611 makes contact with rear-end surfaces of the anvil bearings 46.

The outer-side ring portion 612 is disposed around the anvil bearings 46. The outer-side ring portion 612 is disposed more radially outward than the inner-side ring portion 611 and more forward than the inner-side ring portion 611. In the axial direction (front-rear direction), the location of the outer-side ring portion 612 and the location of at least a portion of each of the anvil bearings 46 are the same. The outer-side ring portion 612 is supported in the hammer case 4. The outer-side ring portion 612 is disposed in the groove portion 404, which is provided on an inner-circumferential surface of the first tube portion 401.

At least a portion of a rear surface of the case-connecting portion 403 opposes a front surface of the outer-side ring portion 612, as can be seen in FIGS. 7-8. The rear surface of the case-connecting portion 403 and the front surface of the outer-side ring portion 612 oppose each other across a gap.

The connecting-ring portion 613 is disposed so as to connect an outer-edge portion of the inner-side ring portion 611 and an inner-edge portion of the outer-side ring portion 612.

In the present embodiment, each of the anvil bearings 46 is a ball bearing. Each of the anvil bearings 46 has an inner ring, balls, and an outer ring. The inner rings of the anvil bearings 46 make contact with the O-rings 45. The balls are disposed between the inner rings and the outer rings in the radial direction. The balls make contact with the inner rings and the outer rings. A plurality of the balls is disposed in the circumferential direction. The outer rings are disposed more radially outward than the inner rings and the balls. The outer rings of the anvil bearings 46 make contact with an inner-circumferential surface of the second tube portion 402.

In the present embodiment, the inner-side ring portion 611 makes contact with rear-end surfaces of the outer rings of the anvil bearings 46. The inner-side ring portion 611 does not make contact with the inner rings of the anvil bearings 46.

The restraining member 62 engages with both the hammer case 4 and the cup washer 61. The restraining member 62 is supported in the hammer case 4. The restraining member 62 is disposed in the groove portion 404. The restraining member 62 restrains (holds, blocks) the cup washer 61 from coming off rearward. A snap ring and a C-ring are illustrative examples of the restraining member 62. The restraining member 62 is disposed in the groove portion 404 so as to make contact with a rear surface of the outer-side ring portion 612. The outer-side ring portion 612 is supported in the hammer case 4 via the restraining member 62.

The anvil bearings 46 are prevented from coming off rearward by the cup washer 61 and the restraining member 62.

As shown in FIG. 8 and FIG. 11, in the present embodiment, distance We between the first flat surfaces 84A and the second flat surfaces 85A is smaller than dimension Wb of the anvil-projection portions 102 in the circumferential direction. Distance We is the width of the grooves 90. In addition, the cross section of the first curved surfaces 84B and the cross section of the second curved surfaces 85B are both arcuate shaped. Distance We between the first flat surfaces 84A and the second flat surfaces 85A is larger than the sum of the radius of the first curved surfaces 84B and the radius of the second curved surfaces 85B.

Operation of Impact Tool

Next, the operation of the impact tool 1 will be explained. For example, when the work of tightening a screw to a work object (workpiece) is to be performed, a driver bit 300 to be used in the tightening work is inserted into the hexagonal-bit hole 10A of the anvil 10. After the driver bit 300 inserted into the hexagonal-bit hole 10A, it is held by the bit-holding mechanism 11. After the driver bit is mounted in the anvil 10, the user grips the grip part 22 with, for example, their right hand and pulls the trigger 14 with the index finger of their right hand. When the trigger 14 is pulled, electric power (current) is supplied from the battery pack 25 to the motor 6, the motor 6 starts, and at the same time the light 17 turns ON. When the motor 6 is energized (driven), the rotor-shaft portions 33 of the rotor 27 rotate. When the rotor-shaft portions 33 rotate, the rotational force of the rotor-shaft portions 33 is transmitted to the planet gears 42 via the pinion gear 41. Because the planet gears 42 mesh with the radially-inward-facing teeth of the internal gear 43, the planet gears 42 revolve (orbit) around the pinion gear 41 while rotating around the respective pins 42P. As was noted above, the planet gears 42 are supported in a rotatable manner on the spindle 8 via the respective pins 42P. When the planet gears 42 are revolving (orbiting) around the pinion gear 41, the spindle 8 rotates at a rotational speed that is lower than the rotational speed of the rotor-shaft portions 33, but at a higher torque.

When the hammer-projection portions 475 contact the anvil-projection portions 102 and the spindle 8 is rotating, the anvil 10 will rotate together with the hammer 47 and the spindle 8. Owing to the rotation of the anvil 10, the tightening work progresses.

However, when a load (torque) that is a prescribed value or more acts on the anvil 10 during the progression of the screw-tightening work, the rotation of the anvil 10 and the hammer 47 stops temporarily. When the rotation of the hammer 47 has temporarily stopped but the spindle 8 continues to rotate relative to the hammer 47, the hammer 47 moves rearward, as was described above. In response to the rearward movement of the hammer 47, contact between the hammer-projection portions 475 and the anvil-projection portions 102 is released. After the hammer 47 has moved rearward, the hammer 47 then moves forward while rotating owing to the forward-biasing elastic force of the first coil spring 51 and the second coil spring 52. When the hammer 47 moves forward while rotating relative to the anvil 10, the anvil-projection portions 102 are impacted (struck, hammered) in the rotational direction by the hammer-projection portions 475. Thus, in this final phase of the screw-tightening work, the anvil 10 is intermittently (repetitively) impacted (struck) by the hammer 47, which causes the anvil 10 to be rotated about motor rotational axis AX at a higher torque. Consequently, a screw, bolt, etc. can be tightened to or in the work object (workpiece) at a higher torque.

Specifications

FIG. 16 is a table that shows the specifications of the impact tool according to the embodiment and impact tools according to comparative examples. FIG. 17 is a table that shows the corner-driving angles of the impact tool according to embodiment and the impact tools according to comparative examples.

The impact tool according to the embodiment is the impact tool 1 that was explained with reference to FIG. 1 to FIG. 15.

The impact tools according to Comparative Example 1, Comparative Example 2, and Comparative Example 3 are impact tools that are already being manufactured and marketed.

The power supplies of the impact tools according to the embodiment and Comparative Examples 1, 2, 3 are battery packs that are mountable on and demountable from the impact tools. The rated voltage of each battery pack is 18 V. It is noted that the rated voltage of each battery pack is arbitrary. The rated voltage of each battery pack may be, e.g., 10.8 V, 14.4 V, 25.2 V, or 36 V.

The maximum tightening torque of the impact tools according to the embodiment and Comparative Examples 1, 2, 3 is 140 N·m or more. As shown in FIG. 16, the maximum tightening torque of the impact tool according to the embodiment is 140 N·m. The maximum tightening torques of the impact tools according to Comparative Examples 1, 2, 3 are 155 N·m, 165 N·m, and 206 N·m, respectively. It is noted that any arbitrary value in the range of 150 N·m or more and 230 N·m or less can be used as the maximum tightening torque of the impact tool according to the embodiment. Any one value of 150 N·m, 160 N·m, 170 N·m, 180 N·m, 190 N·m, 200 N·m, 210 N·m, 220 N·m, and 230 N·m can be used as the maximum tightening torque of the impact tool according to the embodiment, and values between those values can also be used.

As shown in FIG. 3, when the distance—in the front-rear direction parallel to rotational axis AX of the motor 6—between a rear-end portion of the motor-housing part 21 and a front-end portion of the anvil 10 is given as overall length La (axial length), overall length La of the impact tool according to the embodiment is 97 mm. Overall lengths La of the impact tools according to Comparative Examples 1, 2, 3 are 98 mm, 99 mm, and 100 mm, respectively. It is noted that any arbitrary value within the range of 90 mm or more and 98 mm or less can be used as overall length La of the impact tool according to the embodiment. Any one value of 98 mm, 97 mm, 96 mm, 95 mm, 94 mm, 93 mm, 92 mm, 91 mm, and 90 mm can be used as overall length La of the impact tool according to the embodiment, and values between those values can be used.

As shown in FIG. 4, when the dimension in the left-right direction when mounting the battery pack on the impact tool, i.e., the distance in the left-right direction between a left-end portion and a right-end portion of the impact tool and the battery pack, is given as maximum width Ma, maximum width Ma of the impact tool according to the embodiment is 81 mm, and maximum widths Ma of the impact tools according to Comparative Examples 1, 2, 3 are 84 mm, 79 mm, and 78 mm, respectively. Embodiments can be designed in which maximum width Ma is the width of the battery pack, or maximum width Ma is the width of the battery-holding part.

As shown in FIG. 3, when the distance in the up-down direction between an upper-end portion of the motor-housing part 21 and a lower-end portion of the battery pack 25 mounted on the battery-mounting part 13 is given as height Ha, height Ha of the impact tool according to the embodiment is 234 mm. Heights Ha of the impact tools according to Comparative Examples 1, 2, 3 are 243 mm, 237 mm, and 256 mm, respectively. It is noted that any arbitrary value in the range of 226 mm or more and 234 mm or less can be used as height Ha of the impact tool according to the embodiment. Any one value of 234 mm, 232 mm, 230 mm, 228 mm, and 226 mm can be used as height Ha of the impact tool according to the embodiment, and values between those values can be used.

As shown in FIG. 4 and FIG. 7, when the dimension of the motor-housing part 21 in the left-right direction, i.e., the distance in the left-right direction between a left-end portion and a right-end portion of the motor-housing part 21, is given as head-portion width Wa, head-portion width Wa of the impact tool according to the embodiment is 53.4 mm. Head-portion widths Wa of the impact tools according to Comparative Examples 1, 2, 3 are 63.5 mm, 66.5 mm, and 66 mm, respectively. It is noted that any arbitrary value in the range of 47 mm or more and 53 mm or less can be used as head-portion width Wa of the impact tool according to the embodiment. Any one value of 53 mm, 52 mm, 51 mm, 50 mm, 49 mm, 48 mm, and 47 mm can be used as head-portion width Wa of the impact tool according to the embodiment, and values between those values can be used.

As shown in FIG. 3, when the distance in the up-down direction between rotational axis AX and an upper-end portion of the motor-housing part 21 is given as center height Hc, center height He of the impact tool according to the embodiment is 26.3 mm. Center heights He of the impact tools according to Comparative Examples 1, 2, 3 are 30 mm, 30 mm, and 35 mm, respectively. It is noted that any arbitrary value in the range of 22 mm or more and 28 mm or less can be used as center height He of the impact tool according to the embodiment. Any one value of 28 mm, 27 mm, 26 mm, 25 mm, 24 mm, 23 mm, and 22 mm can be used as center height He of the impact tool according to the embodiment, and values between those values can be used.

The ratio [Wa/La] of head-portion width Wa to overall length La is 0.55 for the impact tool according to the embodiment and is 0.65, 0.67, and 0.66 for the impact tools according to Comparative Examples 1, 2, 3. It is noted that any arbitrary value in the range of 0.52 or more and 0.64 or less can be used for the ratio [Wa/La] of the impact tool according to the embodiment. Any one value of 0.64, 0.63, 0.62, 0.61, 0.60, 0.59, 0.58, 0.57, 0.56, 0.55, 0.54, 0.53, and 0.52 can be used as the ratio [Wa/La] of the impact tool according to the embodiment, and values between those values can be used.

The mass, the no-load rotational speed, and the impacts per minute for each of the impact tools according to the embodiment and Comparative Examples 1, 2, 3 are as shown in FIG. 16.

As shown in FIG. 16, the impact tool according to the embodiment satisfies the condition in which the maximum tightening torque is 140 N·m or more, the condition in which overall length La is 100 mm or less, and the condition in which center height Hc is 29 mm or less. In addition, the impact tool according to the embodiment satisfies the condition in which the ratio [Wa/La] of head-portion width Wa to overall length La is 0.6 or less. The impact tool according to the embodiment satisfies the condition in which head-portion width Wa is 65 mm or less.

As shown in FIG. 3, when the distance in the front-rear direction between a rear-end portion of the motor-housing part 21 and a front-end portion of a driver bit 300 mounted on the anvil 10 is given as total overall length Lh, the impact tool according to the embodiment satisfies the condition in which total overall length Lh is 140 mm or less.

Figure 18:
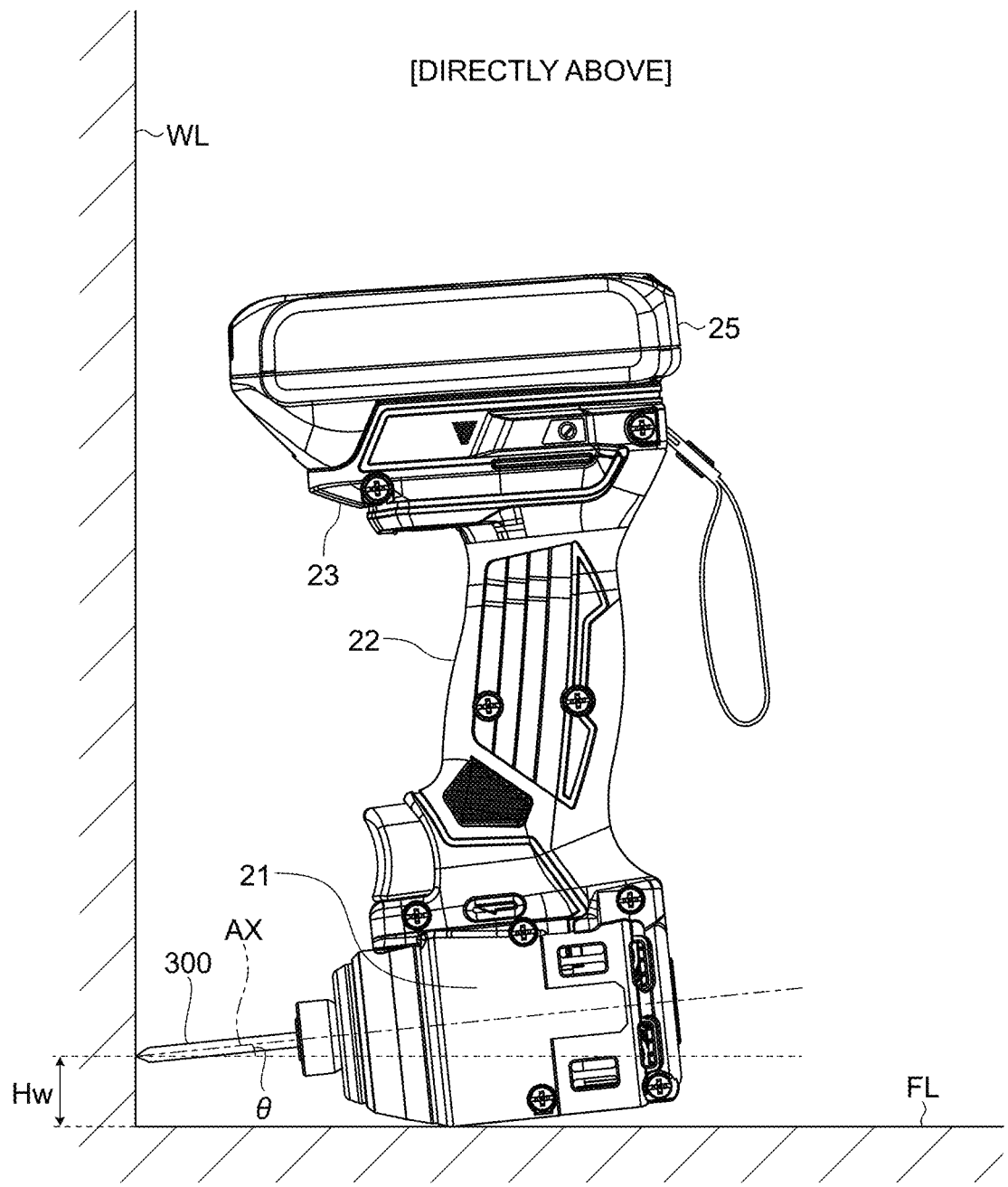
FIG. 18 is a drawing for explaining a first corner-driving condition of the impact tool.
Figure 19:
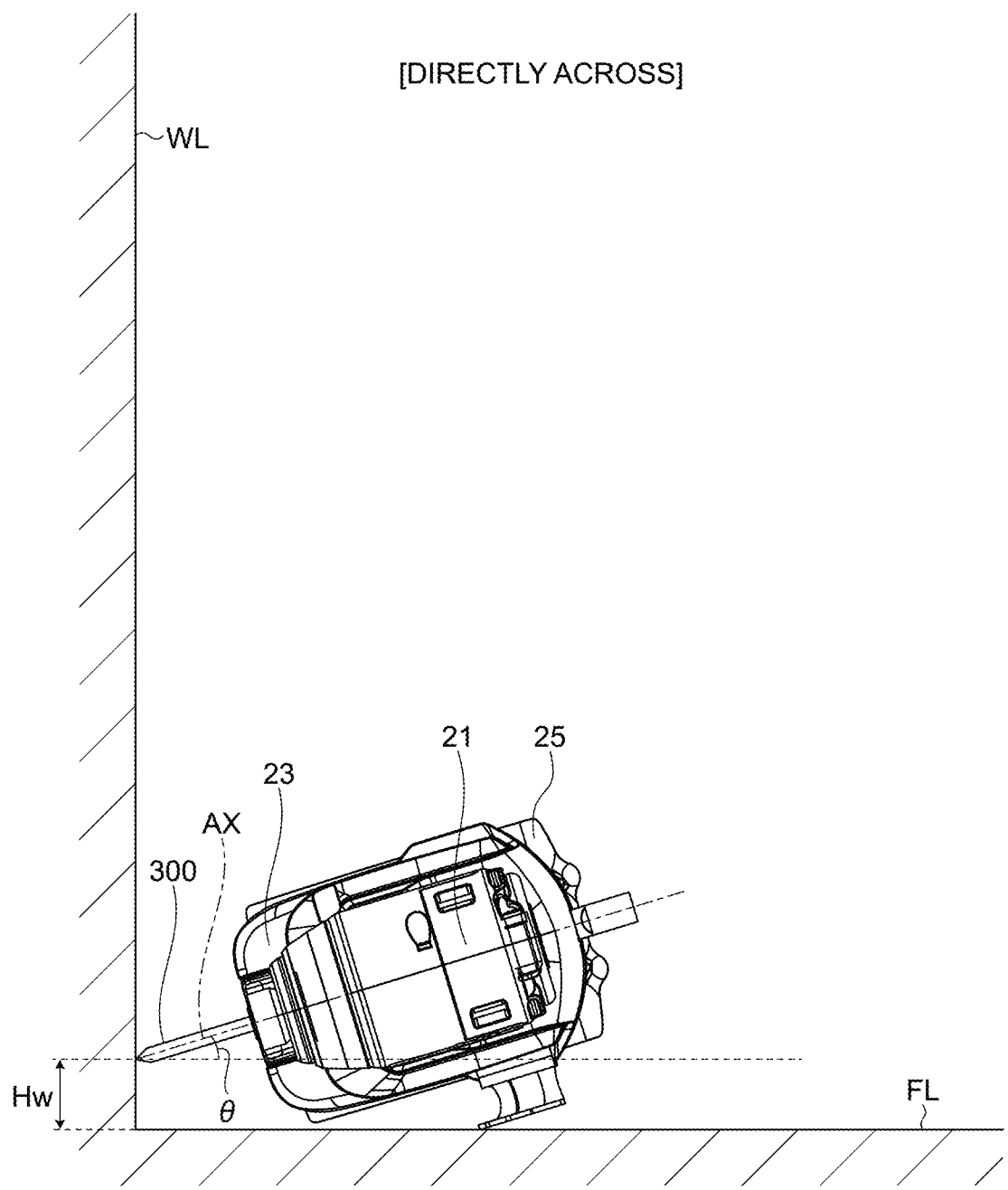
FIG. 19 is a drawing for explaining a second corner-driving condition of the impact tool.
Figure 20:
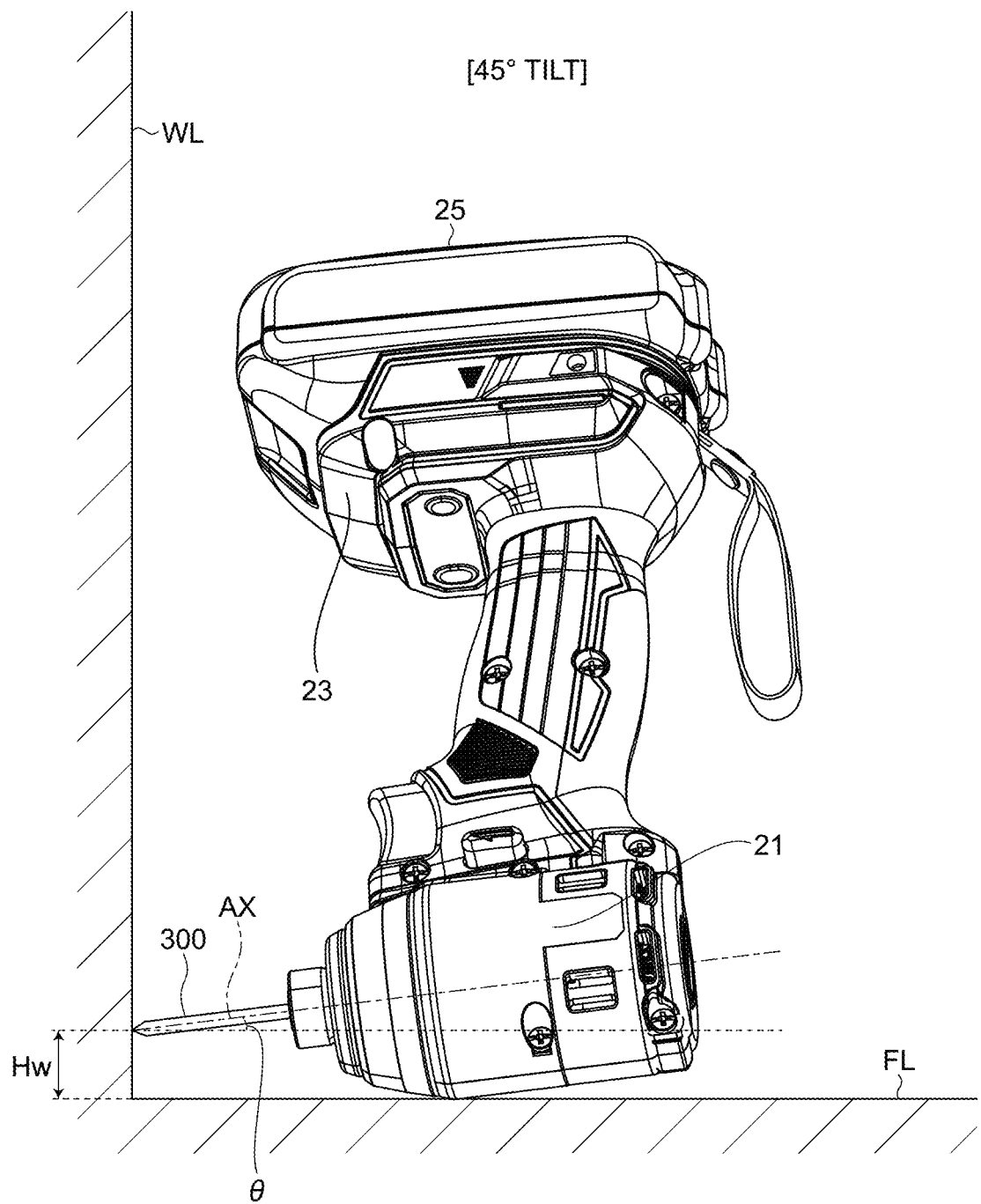
FIG. 20 is a drawing for explaining a third corner-driving condition of the impact tool.

FIGS. 18-20 each are drawings for explaining different corner-driving conditions of the impact tool. As shown in FIGS. 18-20, corner driving refers to performing work at wall surface WL orthogonal to floor surface FL using the driver bit 300 to tighten a screw at a location that is upward by stipulated distance Hw from floor surface FL. Corner-driving angle θ refers to the angle formed between rotational axis AX and floor surface FL when performing work at wall surface WL orthogonal to floor surface FL using the driver bit 300 to tighten a screw at a location that is upward by stipulated distance Hw from floor surface FL. In evaluation tests disclosed in the present specification, stipulated distance Hw was 10 mm. That is, corner-driving angle θ according to the evaluation tests disclosed in the present specification refers to the angle formed between rotational axis AX and floor surface FL when performing work at wall surface WL orthogonal to floor surface FL using the driver bit 300 to tighten a screw at a location that is upward by 10 mm from floor surface FL.

In the evaluation tests disclosed in the present specification, a driver bit 300 having a length of 65 mm was used. In addition, corner driving was performed at three attitudes: "directly above", "directly across", and at a "45° tilt". As shown in FIG. 18, "directly above" refers to an attitude of the impact tool in which the battery-holding part 23 is disposed directly above the motor-housing part 21. As shown in FIG. 19, "directly across" refers to an attitude of the impact tool in which the battery-holding part 23 is disposed directly across from the motor-housing part 21. As shown in FIG. 20, "45° tilt" refers to an attitude of the impact tool in which the battery-holding part 23 is disposed with an upward tilt of 450 relative to the motor-housing part 21.

As shown in FIG. 17, in the directly above attitude, corner-driving angle θ of the impact tool according to the embodiment was 11.4°. Corner-driving angles θ of the impact tools according to Comparative Examples 2, 3 were 12.2° and 12.5°, respectively. In the directly across attitude, corner-driving angle θ of the impact tool according to the embodiment was 11.0°. Corner-driving angles θ of the impact tools according to Comparative Examples 2, 3 were 16.2° and 15.7°, respectively. In the 45° tilt attitude, corner-driving angle θ of the impact tool according to the embodiment was 11.9°. Corner-driving angles θ of the impact tools according to Comparative Examples 2, 3 were 13.2° and 12.9°, respectively. It is noted that the impact tool according to Comparative Example 1 could not be corner driven. Thus, the impact tool according to the embodiment met the condition in which corner-driving angle θ is 12° or less.

Effects

As explained above, in the embodiment, the impact tool 1 comprises: the motor 6 comprising the stator 26 and the rotor 27, at least a portion of which is disposed in the interior of the stator 26 and which rotates about rotational axis AX; the spindle 8, which is disposed more forward than the stator 26 and rotates in response to the generation of a rotational force by the rotor 27; the anvil 10, at least a portion of which is disposed more forward than the spindle 8 and in which the driver bit 300 is mountable; the hammer 47, which is adapted/configured to impact the anvil 10 in the rotational direction; and the housing 2, which has the motor-housing part 21 that houses the motor 6.

The maximum tightening torque is 140 N·m or more.

Overall length La, which is the distance—in the front-rear direction parallel to rotational axis AX—between a rear-end portion of the motor-housing part 21 and a front-end portion of the anvil 10, is 100 mm or less.

Center height Hc, which is the distance in the up-down direction between rotational axis AX and an upper-end portion of the motor-housing part 21, is 29 mm or less.

Total overall length Lh, which is the distance in the front-rear direction between a rear-end portion of the motor-housing part 21 and a front-end portion of the driver bit 300 mounted on the anvil 10, is 140 mm or less.

Corner-driving angle θ, which is the angle formed between rotational axis AX and floor surface FL when work is performed at wall surface WL orthogonal to floor surface FL using the driver bit 300 to tighten a screw at a location that is upward by 10 mm from the floor surface, is 12° or less.

Head-portion width Wa, which is the dimension of the motor-housing part 21 in the left-right direction, is 65 mm or less.

The ratio [Wa/La] of head-portion width Wa to overall length La is 0.6 or less.

According to the above-mentioned configuration, a user can easily perform work using the impact tool 1, even in a cramped portion or a corner portion. For example, as shown in FIG. 18, in the situation in which corner driving is performed at an angle formed between floor surface FL and wall surface WL, the impact tool 1 according to the embodiment can more smoothly perform tightening work at a location where stipulated distance Hw is small (a low location) than the impact tools according to the Comparative Examples.

Other Embodiments

In the embodiment described above, the impact tool 1 is not limited to an impact driver. The impact tool 1 may also be an impact wrench.

In the embodiment described above, it is assumed that the power supply of the impact tool 1 is the battery pack 25. However, the power supply of the impact tool 1 may instead be a commercial power supply (AC power supply).

In an additional aspect of the present teachings, an impact tool may comprise:
- a motor comprising a stator and a rotor, at least a portion of which is disposed in the interior of the stator and which is rotatable about a rotational axis;
- a spindle disposed axially forward of the stator and configured to be rotated in response to rotation of the rotor;
- an anvil, at least a portion of which is disposed axially forward of the spindle and in which a bit is mountable;
- a hammer configured to impact the anvil in a rotational direction; and
- a housing having a motor-housing part that houses the motor;

wherein:
- the impact tool has a maximum tightening torque of at least 140 N·m;
- the impact tool has an overall length (La), which is a distance—in a front-rear direction parallel to the rotational axis-between a rear-end portion of the motor-housing part and a front-end portion of the anvil, of 100 mm or less;
- the impact tool has a head-portion width (Wa), which is the dimension of the motor-housing part in a left-right direction, of 65 mm or less; and
- the ratio of the head-portion width (Wa) to the overall length (La) is 0.6 or less.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools, such as impact wrenches and impact drivers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact tool
2 Housing
2L Left housing
2R Right housing
2S Screw
4 Hammer case
5A Hammer-case cover
5B Bumper
5C Housing cover
6 Motor
7 Speed-reducing mechanism
8 Spindle
8A Hammer-sliding surface
8B Anvil-sliding surface
9 Impact mechanism
10 Anvil
10A Hexagonal-bit hole
10B Rear-end portion
11 Bit-holding mechanism
12 Fan
12A Bushing
13 Battery-mounting part
14 Trigger
15 Forward/reverse-change switch
16 Operation-and-display part
16A First manipulatable button
16B Second manipulatable button
17 Light
18 Controller
19 Air-intake opening
20 Air-exhaust opening
21 Motor-housing part
21A Tubular part
21B Rear-plate part
22 Grip part
23 Battery-holding part
24 Bearing box
24A O-ring
25 Battery pack
25A Lock-release button
26 Stator
27 Rotor
28 Stator core
29 Front insulator
29S Screw
30 Rear insulator
31 Coil
32 Rotor-core portion
33 Rotor-shaft portion
33F Front-side shaft portion
33R Rear-side shaft portion
34 Rotor magnet
35 Sensor magnet
37 Sensor board
38 Fusing terminal
39 Rotor bearing
39F Front-side rotor bearing
39R Rear-side rotor bearing
41 Pinion gear
42 Planet gear
42P Pin
43 Internal gear
44 Spindle bearing
45 O-ring
46 Anvil bearing
47 Hammer
48 Hammer ball
50 Coil spring
51 First coil spring
52 Second coil spring
53 Washer
54 Support ball 61 Cup washer
62 Restraining member
71 Ball
73 Sleeve
74 Coil spring
76 Support-recessed portion
81 First side surface
82 Second side surface
83 Front surface
84 First connecting surface
84A First flat surface
84B First curved surface
85 Second connecting surface
85A Second flat surface
85B Second curved surface
90 Groove
101 Anvil-shaft portion
102 Anvil-projection portion
103 Anvil-protruding portion
104 Impacted surface
241 Recessed portion
242 Protruding portion
300 Driver bit (bit)
401 First tube portion
402 Second tube portion
403 Case-connecting portion
404 Groove portion
471 Base portion
472 Front-side ring portion
472A Outer-circumferential surface
473 Rear-side ring portion
473R Rear-end portion
474 Support-ring portion
474R Rear-end portion
475 Hammer-projection portion
476 Recessed portion
477 Hammer groove
478 Support groove
479 Slid-on surface
611 Inner-side ring portion
612 Outer-side ring portion
613 Connecting-ring portion
801 Spindle-shaft portion
802 Flange portion
803 Protruding portion
804 Spindle groove
805 Spindle-recessed portion
AX Rotational axis

The invention claimed is:

1. An impact tool comprising:
a motor comprising a stator and a rotor, at least a portion of which is disposed in the interior of the stator and which is rotatable about a rotational axis (AX);
a spindle disposed axially forward of the stator and configured to be rotated in response to rotation of the rotor;
an anvil, at least a portion of which is disposed axially forward of the spindle and in which a bit is mountable;
a hammer adapted to impact the anvil in a rotational direction; and
a housing having a motor-housing part that houses the motor;
wherein:
the impact tool has a maximum tightening torque of at least 140 N·m;
the impact tool has an overall length (La), which is a distance—in a front-rear direction parallel to the rotational axis—between a rear-end portion of the motor-housing part and a front-end portion of the anvil, of 100 mm or less; and
the hammer has a base portion, a front-side ring portion protruding forward from the base portion, and hammer projection portions protruding radially inward from the front ring portion.

2. The impact tool according to claim 1, wherein the hammer further comprises a support-ring portion disposed radially inward of the base portion, the support-ring portion contacting the spindle.

3. The impact tool according to claim 2, wherein the hammer further comprises a rear-side ring portion protruding from a rear portion of the base portion.

4. The impact tool according to claim 3, wherein: the
the anvil has anvil-projection portions, and
a plane perpendicular to the rotational axis intersects the front-side ring portion, the hammer projection portions, and the anvil projection portions.

5. The impact tool according to claim 4, wherein the impact tool has a ratio of head-portion width (Wa), which is the dimension of the motor-housing part in a left-right direction, to the overall length (La) of 0.6 or less.

6. The impact tool according to claim 1, wherein the impact tool has a ratio of head-portion width (Wa), which is the dimension of the motor-housing part in a left-right direction, to the overall length (La) of 0.6 or less.

7. An impact tool comprising:
a motor comprising a stator and a rotor, at least a portion of which is disposed in the interior of the stator and which is rotatable about a rotational axis;
a spindle disposed axially forward of the stator and configured to be rotated in response to rotation of the rotor;
an anvil, at least a portion of which is disposed axially forward of the spindle and in which a bit is mountable;
a hammer configured to impact the anvil in a rotational direction; and
a housing having a motor-housing part that houses the motor;
wherein:
the impact tool has a maximum tightening torque of at least 140 N·m; and
the impact tool has an overall length (La), which is a distance—in a front-rear direction parallel to the rotational axis—between a rear-end portion of the motor-housing part and a front-end portion of the anvil, of 97 mm or less.

8. The impact tool according to claim 7, wherein the impact tool has a ratio of head-portion width (Wa), which is the dimension of the motor-housing part in a left-right direction, to the overall length (La) of 0.6 or less.

* * * * *